(12) United States Patent
Nakagami et al.

(10) Patent No.: US 11,790,567 B2
(45) Date of Patent: Oct. 17, 2023

(54) INFORMATION PROCESSING APPARATUS AND METHOD

(71) Applicant: SONY CORPORATION, Tokyo (JP)

(72) Inventors: Ohji Nakagami, Tokyo (JP); Koji Yano, Tokyo (JP); Satoru Kuma, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 485 days.

(21) Appl. No.: 17/045,417

(22) PCT Filed: Mar. 28, 2019

(86) PCT No.: PCT/JP2019/013534
§ 371 (c)(1),
(2) Date: Oct. 5, 2020

(87) PCT Pub. No.: WO2019/198520
PCT Pub. Date: Oct. 17, 2019

(65) Prior Publication Data
US 2021/0158575 A1 May 27, 2021

(30) Foreign Application Priority Data
Apr. 11, 2018 (JP) ................................. 2018-076224

(51) Int. Cl.
*G06K 9/00* (2022.01)
*G06T 9/40* (2006.01)
(Continued)

(52) U.S. Cl.
CPC ................ *G06T 9/40* (2013.01); *G06F 17/18* (2013.01); *G06T 9/001* (2013.01)

(58) Field of Classification Search
None
See application file for complete search history.

(56) References Cited

U.S. PATENT DOCUMENTS

2006/0221075 A1* 10/2006 Hashima ............... G06T 17/005
345/424
2021/0021869 A1* 1/2021 Wang ...................... G06T 9/001

FOREIGN PATENT DOCUMENTS

EP 1708142 A1 10/2006
JP 2006-277562 A 10/2006

OTHER PUBLICATIONS

International Search Report and Written Opinion of PCT Application No. PCT/JP2019/013534, dated Jul. 2, 2019, 07 pages of ISRWO.

(Continued)

*Primary Examiner* — Avinash Yentrapati
(74) *Attorney, Agent, or Firm* — CHIP LAW GROUP

(57) ABSTRACT

The present disclosure relates to an information processing apparatus and method that are capable of suppressing a decrease in encoding efficiency. When point cloud data is to be Octree-encoded, a point distribution of child nodes of a current node is updated in accordance with a peripheral point distribution around the current node, and then a sequence of signals is generated by performing Octree encoding with the updated point distribution. The present disclosure is applicable, for example, to information processing apparatuses, image processing apparatuses, electronic equipment, information processing methods, or programs.

20 Claims, 24 Drawing Sheets

(51) Int. Cl.
*G06F 17/18* (2006.01)
*G06T 9/00* (2006.01)

(56) References Cited

OTHER PUBLICATIONS

Mekuria, et al., "Design, Implementation and Evaluation of a Point Cloud Codec for Tele-Immersive Video", IFFF Transactions on circuits and systems for video technology, vol. 27, No. 4, Apr. 2017, 15 Pages.

* cited by examiner

FIG. 3

| | | |
|---|---|---|
| METHOD #1 | \multicolumn{2}{CHANGES childmask IN ACCORDANCE WITH POINT DISTRIBUTION AROUND CURRENT NODE} |
| | TARGET NOTE | LEAF NODE |
| | | INTERMEDIATE NODE |
| | DESCRIPTION OF CHANGE | MAKES CHANGE TO DECREASE DISTORTION FUNCTION WITH RESPECT TO MAXIMUM LIKELIHOOD PATTERN OF CURRENT NODE |
| | MAXIMUM LIKELIHOOD PATTERN | DERIVATION BASED ON PATTERN OF PERIPHERAL NODES |
| | | DERIVE BY Octree ENCODING |
| | | DERIVATION FOR EACH HIERARCHICAL LAYER |
| | DISTORTION INDEX VALUE | HAMMING DISTANCE |
| | | HAUSDORFF DISTANCE |
| | | SCORE ASSIGNED TO SPECIFIC PATTERN |
| | | SELECTION BASED ON EVALUATION CRITERIA REGARDING COMPRESSED SIZE AND IMAGE QUALITY |
| | ATTRIBUTE INFORMATION CHANGE | COLOR INFORMATION |
| | | Reflectance OF Lidar DATA |
| | | Normal INFORMATION |
| METHOD #2 | APPLICATION OF DIFFERENTIAL ENCODING | |
| | DIFFERENTIAL ENCODING METHOD | Mesh ENCODING |
| | | DIFFERENTIAL VOXEL PATTERN ENCODING |
| | | PREDICTIVE ENCODING BASED ON VOXEL PATTERN OF PERIPHERAL NODES |
| | | RD COST OPTIMIZATION |

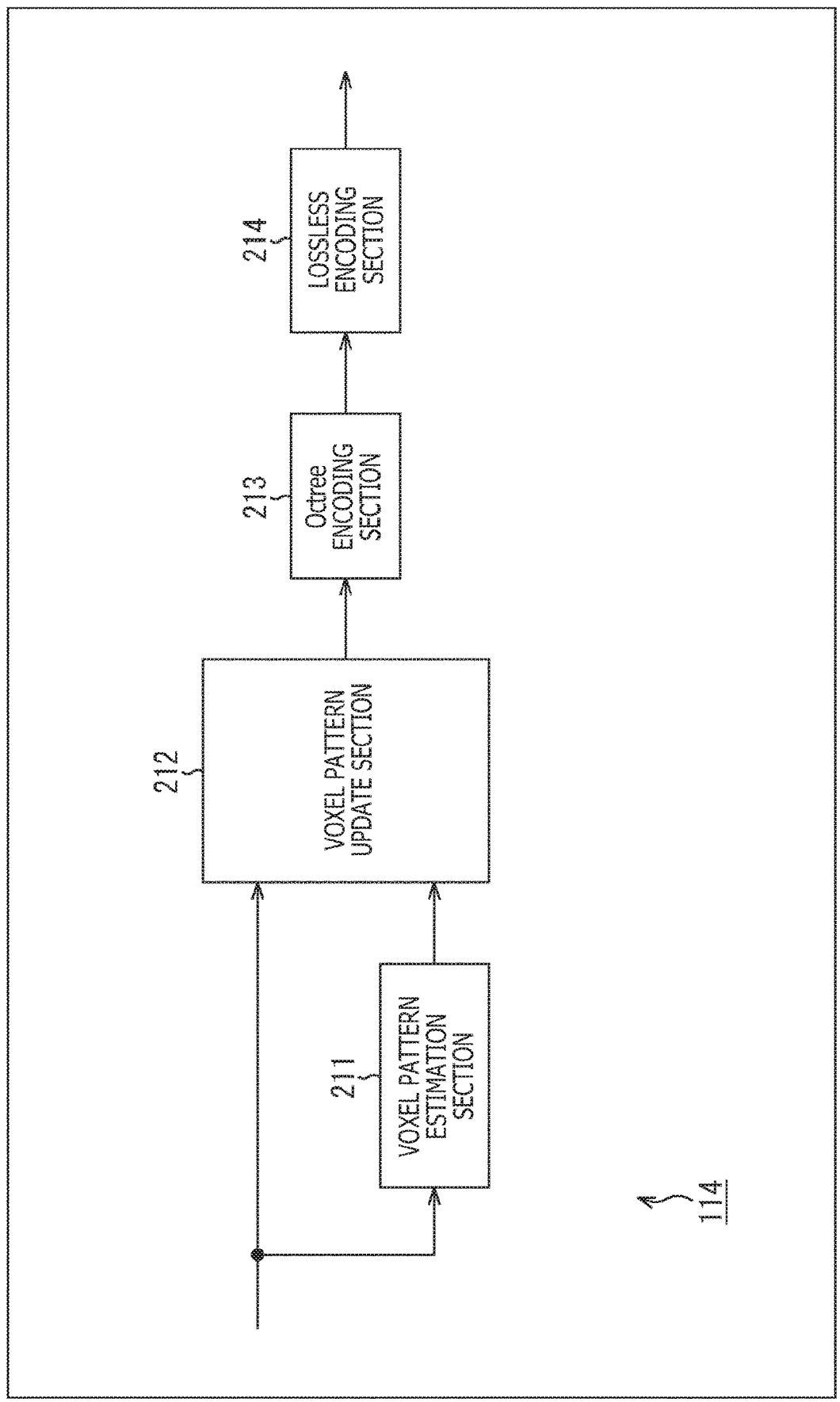

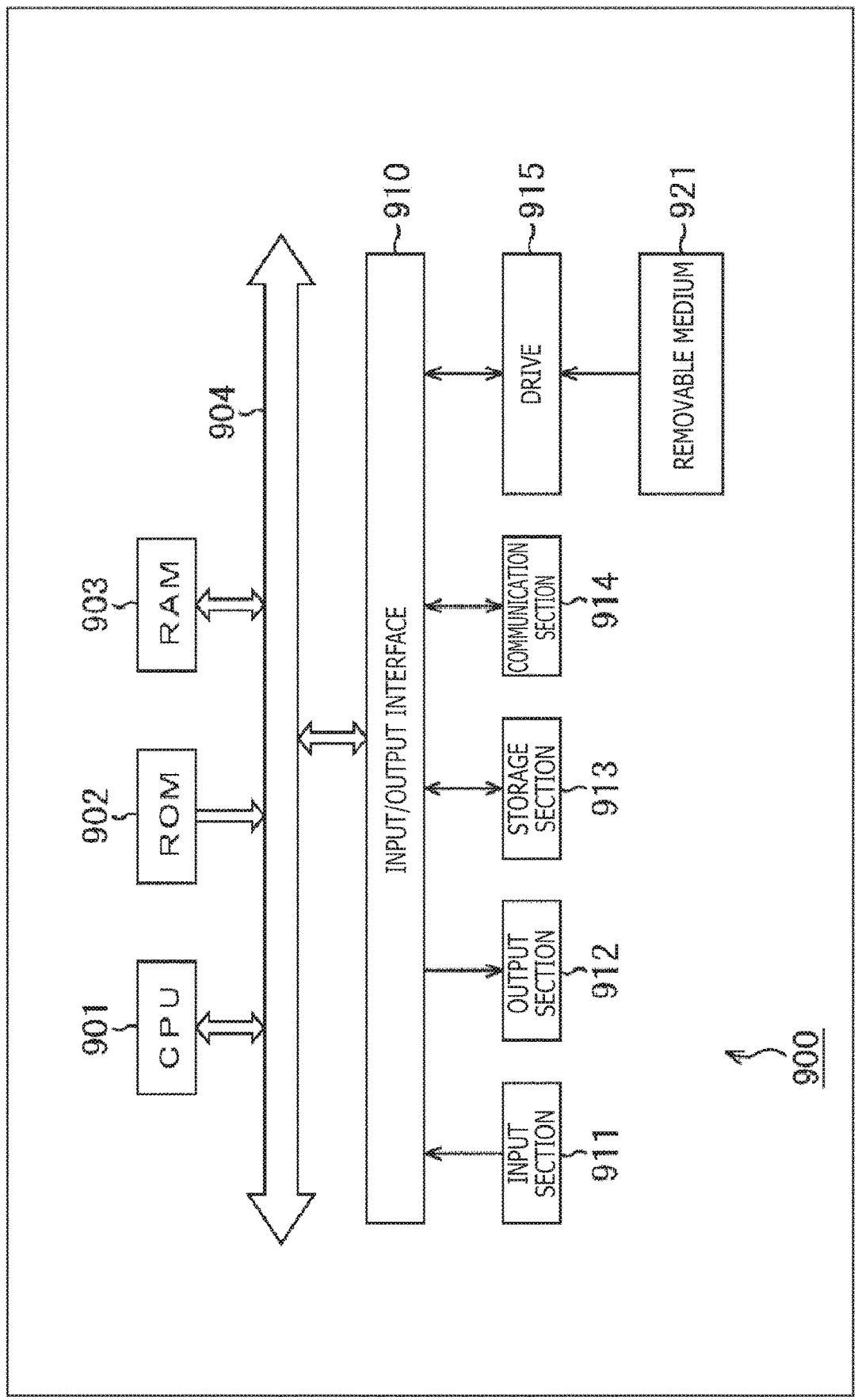

INFORMATION PROCESSING APPARATUS AND METHOD

CROSS REFERENCE TO RELATED APPLICATIONS

This application is a U.S. National Phase of International Patent Application No. PCT/JP2019/013534 filed on Mar. 28, 2019, which claims priority benefit of Japanese Patent Application No. JP 2018-076224 filed in the Japan Patent Office on Apr. 11, 2018. Each of the above-referenced applications is hereby incorporated herein by reference in its entirety.

TECHNICAL FIELD

The present disclosure relates to an information processing apparatus and method, and more particularly, to an information processing apparatus and method that are capable of reducing quality degradation due to two-dimensional projection of 3D data.

BACKGROUND ART

In the past, a voxel-based encoding method, such as an Octree method, has been configured as a point cloud method of expressing a three-dimensional structure, for example, by using location information and attribute information regarding a point group and as a method of compressing vertex data for a mesh including vertexes, edges, and faces, and defining a three-dimensional shape by means of polygonal representation (refer, for example, to NPL 1).

CITATION LIST

Non-Patent Literature

[NPL 1]
R. Mekuria, Student Member IEEE, K. Blom, P. Cesar, Member, IEEE, "Design, Implementation and Evaluation of a Point Cloud Codec for Tele-Immersive Video," tcsvt_paper_submitted_february.pdf

SUMMARY

Technical Problem

However, in a case where the Octree method is used, the size of a compressed file can be adjusted only by changing a resolution (the number of voxel hierarchical layers (LoD)). Therefore, it is difficult to exercise control due to significant changes in the amount of coding. For example, when a request is made to specify the resolution, the number of voxel hierarchical layers is determined by the request. This make it difficult to further reduce the amount of coding. That is, it is anticipated that encoding efficiency might decrease.

The present disclosure has been made in view of the above circumstances, and makes it possible to suppress a decrease in the encoding efficiency.

Solution to Problem

An information processing apparatus according to an aspect of the present technology includes a point distribution update section and an Octree encoding section. The point distribution update section updates, for Octree encoding of point cloud data, a point distribution of child nodes of a current node in accordance with the point distribution around the current node. The Octree encoding section generates a sequence of signals by performing Octree encoding with the point distribution updated by the point distribution update section.

An information processing method according to an aspect of the present technology includes the steps of updating, for Octree encoding of point cloud data, a point distribution of child nodes of a current node in accordance with the point distribution around the current node, and generating a sequence of signals by performing Octree encoding with the updated point distribution.

The information processing apparatus and method according to an aspect of the present technology update, for Octree encoding of point cloud data, a point distribution of child nodes of a current node in accordance with the point distribution around the current node, and generate a sequence of signals by performing Octree encoding with the updated point distribution.

Advantageous Effects of Invention

The present disclosure makes it possible to process information, and more particularly, suppress a decrease in encoding efficiency.

BRIEF DESCRIPTION OF DRAWINGS

FIG. 3 is a diagram illustrating some features of the present technology.

FIG. 12 is a diagram illustrating a main configuration example of an encoding section.

FIG. 24 is a block diagram illustrating a main configuration example of a computer.

DESCRIPTION OF EMBODIMENTS

Modes for implementing the present disclosure (hereinafter referred to as the embodiments) will now be described. The description will be given in the following order.

1. Octree Encoding
2. First Embodiment (Childmask Update based on Peripheral Point Distribution)
3. Second Embodiment (Differential Encoding)
4. Supplementary Notes <1. Octree Encoding>
<Documents Supporting Technical Details and Terms>

The scope disclosed by the present technology includes not only the contents described in conjunction with the embodiments, but also the contents described in the following Non Patent Literature, which are publicly known at the time of application.

NPL 1: (Described above)
NPL 2: TELECOMMUNICATION STANDARDIZATION SECTOR OF ITU (International Telecommunication Union), "Advanced video coding for generic audiovisual services", H.264, 04/2017
NPL 3: TELECOMMUNICATION STANDARDIZATION SECTOR OF ITU (International Telecommunication Union), "High efficiency video coding", H.265, 12/2016
NPL 4: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents described in the above Non Patent Literature also provide the basis for determining support requirements. For example, technical terms, such as parsing, syntax, and semantics, are also assumed to be within the scope disclosed by the present technology and satisfying the support requirements for the appended claims even in a case where such technical terms are not directly mentioned in conjunction with the embodiments.

<Point Cloud>

Data, such as a point cloud and a mesh, existed in the past. The point cloud expresses a three-dimensional structure by using, for example, location information and attribute information regarding a point group. The mesh includes vertexes, edges, and faces, and defines a three-dimensional shape by means of polygonal representation.

Figure 1B:
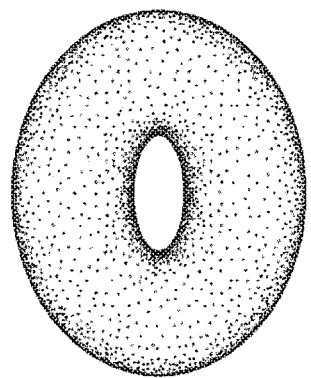
FIGS. 1A and 1B are diagrams illustrating examples of point clouds.
Figure 1A:
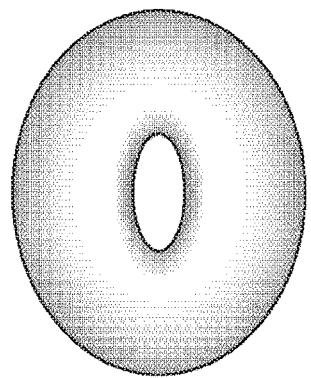

For example, in the case of a point cloud, a cubic structure depicted in FIG. 1A is expressed as a set of many points (a point group) depicted in FIG. 1B. That is, point cloud data includes the location information and attribute information (e.g., color) regarding each point in the point group. Therefore, the point cloud data not only has a relatively simple data structure, but also includes a sufficiently large number of points. This makes it possible to express a cubic structure with sufficient accuracy.

However, the above-mentioned data, such as the point cloud and the mesh, is relatively large in data amount. Therefore, it is demanded that the above-mentioned data be compressed in data amount, for example, by encoding. In view of such circumstances, an encoding method based on a voxel is conceived. The voxel is a data structure for quantizing the location information regarding an encoding target. Octree encoding is an encoding method that reduces the amount of information by arranging the locations of individual points in a point cloud in accordance with a predetermined data unit called a voxel, and hierarchically expressing whether or not points are present in each voxel.

Figure 2B:
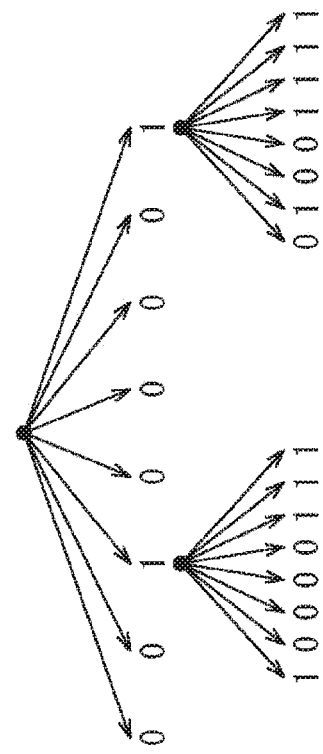
FIGS. 2A and 2B are diagrams illustrating an overview of Octree encoding.
Figure 2A:
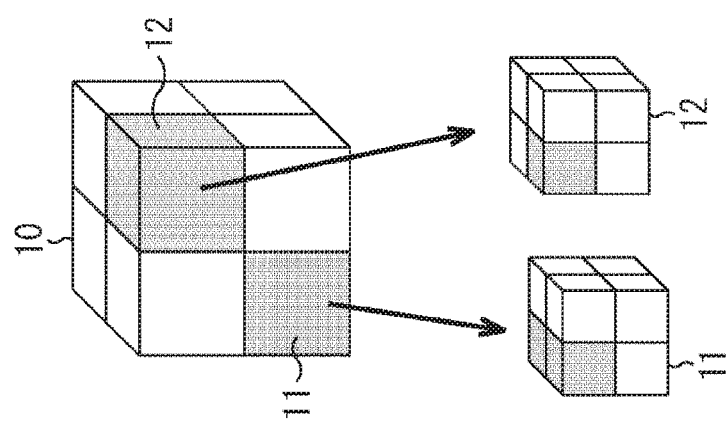

For example, a space (parent node) having a predetermined size and depicted in FIG. 2A is divided into 2×2×2 spaces (child nodes). A space depicted in gray color in FIG. 2A indicates that points exist in the space. A space depicted in white color indicates that no point exists in the space. For example, in the case of a node 10, points exist in each of nodes 11 and 12, which are child nodes.

The spaces of the nodes 11 and 12 are further divided into 2×2×2 spaces to indicate whether or not points exist in each of the resulting spaces. In Octree encoding, information indicating whether or not points are present in each space is hierarchized down to the lowest-hierarchical-layer voxel as described above. As data, "0" and "1" are used as depicted in FIG. 2B to express whether or not points are present in each space, and the hierarchy of a space depicted in FIG. 2A is expressed as a tree structure. For example, "1" is assigned to a node in a space containing points, and "0" is assigned to a node in a space containing no point. Nodes lower than a node assigned "0" are all "0" because no point exists in such lower nodes. That is, a low hierarchical layer should practically be expressed only for nodes assigned "1." This makes it possible to reduce the amount of information.

However, in the case of Octree encoding, the size of a compressed file can be adjusted only by changing a resolution (the number of voxel hierarchical layers (LoD)). Therefore, it is difficult to exercise control due to significant changes in the amount of coding. For example, when a request is made to specify the resolution, the number of voxel hierarchical layers is determined by the request. This make it difficult to further reduce the amount of coding. That is, it is anticipated that encoding efficiency might decrease (typically, it is difficult to increase the encoding efficiency). Under such circumstances, an alternative method of coding amount control is demanded.

<Update of Childmask>

Accordingly, in Octree encoding of point cloud data, the point distribution of child nodes of a current node is updated in accordance with the point distribution around the current node, and a sequence of signals is generated by performing Octree encoding with the updated point distribution.

For example, an information processing apparatus includes a point distribution update section and an Octree encoding section. The point distribution update section updates, for Octree encoding of point cloud data, a point distribution of child nodes of a current node in accordance with the point distribution around the current node. The Octree encoding section generates a sequence of signals by performing Octree encoding with the point distribution updated by the point distribution update section.

The above-described configuration makes it possible to control the amount of coding without changing the resolution (voxel LoD). That is, it is possible to suppress a decrease in the encoding efficiency (typically, increase the encoding efficiency) without changing the resolution (voxel LoD). For example, it is possible to inhibit the encoding efficiency from being decreased by an increase in the resolution of Octree encoding (an increase in the number of voxel hierarchical layers).

<Example Methods>
<Method #1>

A table 31 in FIG. 3 summarizes some features of the above-mentioned coding amount control method. Method #1 changes a child mask (childmask) of an Octree current node as described above in accordance with appearance of the point distribution of nodes around the current node.

The child mask (childmask) is information indicating appearance of the point distribution of child nodes. For example, the child mask (childmask) includes an 8-bit stream that indicates the presence of points in each of eight child nodes by "0" or "1" as depicted in FIGS. 2A and 2B.

Figure 4:
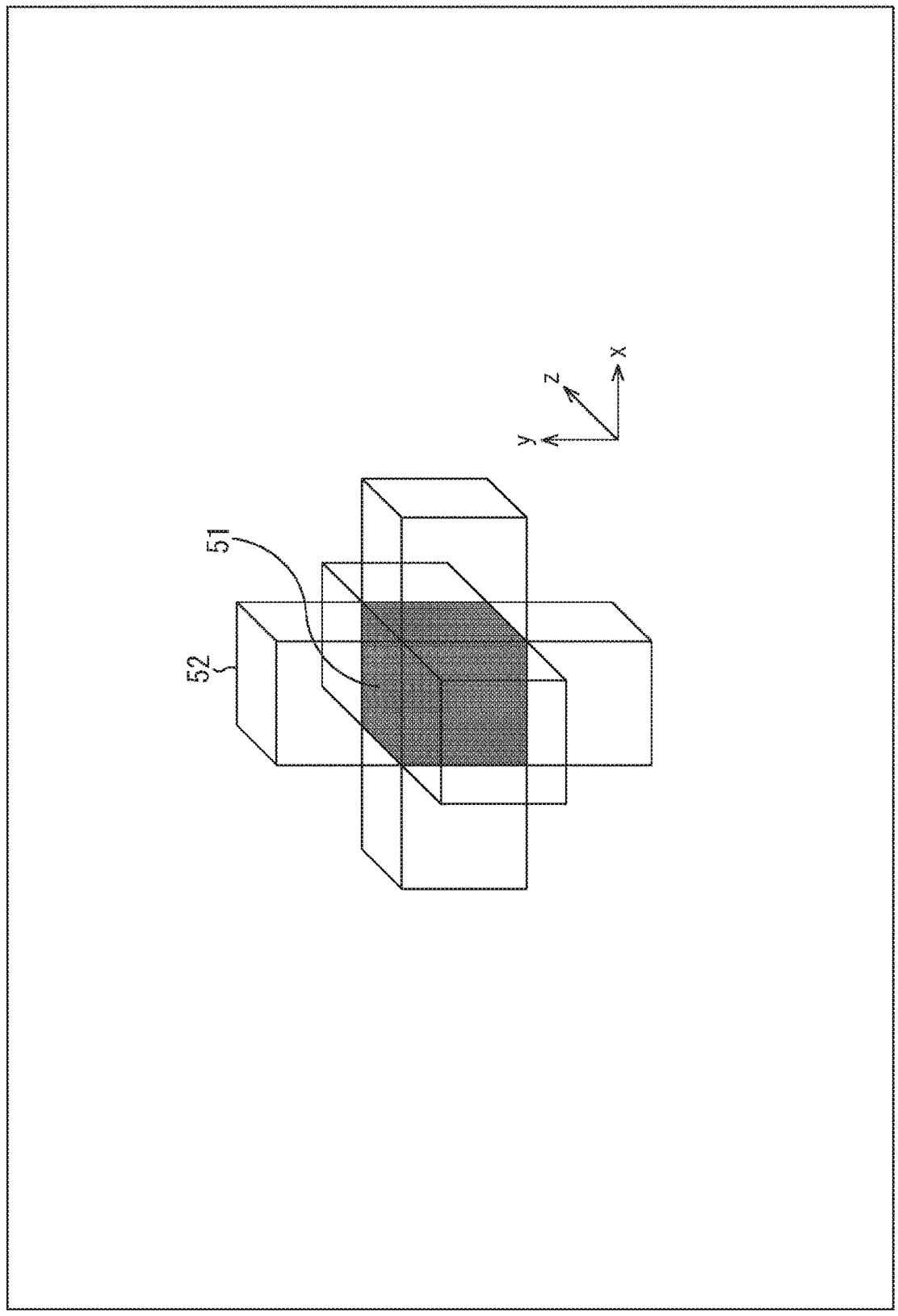
FIG. 4 is a diagram illustrating an example target range of point distribution.

Further, the nodes around the current node (peripheral nodes) represent a space around the current node (a processing target space). Detailed locations of the peripheral nodes are not particularly limited. The peripheral nodes may represent a space contiguous to the current node (a space adjacent to the processing target space) or a space not contiguous to the current node (a space apart from the processing target space). For example, as depicted in FIG. 4, six spaces, namely, upper, lower, front, rear, left, and right spaces, adjacent to a current node 51 (processing target space) may be regarded as peripheral nodes 52.

Figure 5:
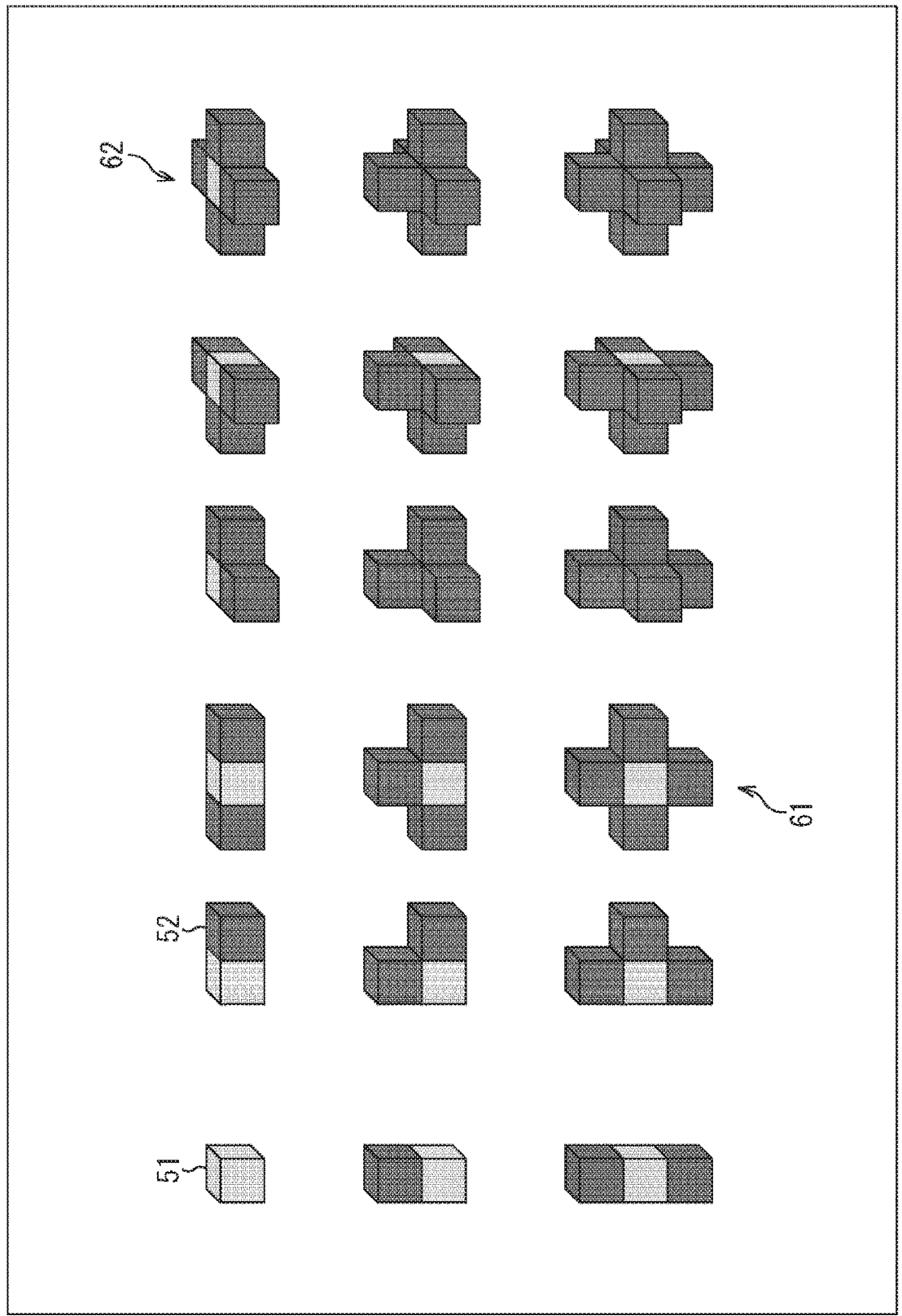
FIG. 5 is a diagram illustrating examples of point distribution patterns.

The appearance of the point distribution of the peripheral nodes represents a pattern indicating which of the peripheral nodes 52 includes points, that is, the positional relation between the current node 51 and the peripheral nodes 52 in which points exist. For example, in a case where the six spaces depicted in the example of FIG. 4 are regarded as the peripheral nodes 52, patterns depicted in FIG. 5 are conceivable.

In the above-described manner, it is possible to suppress a decrease in the encoding efficiency (typically, increase the encoding efficiency) without changing the resolution (voxel LoD).

<Target Node>

As described above, a node targeted for a child mask (childmask) change (a target node) may be, for example, a lowest-hierarchical-layer node (leaf node). Further, a node in a hierarchical layer higher than the leaf node (an intermediate node) may be regarded as the target node. That is, nodes in predetermined hierarchical layers including the lowest hierarchical layer may be targeted for processing.

However, in a case where the child mask (childmask) of the intermediate node is to be changed, it is basically necessary to additionally change the child mask (childmask) of each low-hierarchical-layer node belonging to the intermediate node in accordance with such a child mask (childmask) change of the intermediate node. When, for example, points are added to the child mask (childmask) of the intermediate node, the addition of points is also required for the child mask (childmask) of each low-hierarchical-layer node belonging to the intermediate node. In such an instance, however, it is highly probable that it will be difficult to exercise control so as to designate a child node to which points are to be added (it is necessary to perform complicated work related to a pattern change). In view of such circumstances, the child mask (childmask) change of the intermediate node may be limited to the direction of decreasing the number of points (limited to a change involving no point addition).

<Description of Change>

The way of changing the child mask (childmask) (child mask (childmask) changes) may be, for example, decreasing a distortion function with respect to a maximum likelihood pattern of the current node.

The sequence of signals generated by Octree encoding is lossless-encoded and converted to a bit stream as described later. In such an instance, the efficiency of lossless encoding increases with an increase in the bias of a child mask (childmask) pattern.

Meanwhile, 3D data generally derived from images captured by a camera is such that points are distributed to form a face due to an employed image capturing method. Therefore, in the current node, a pattern for joining the points existing in the peripheral nodes with faces and lines is likely to be generated. That is, as regards each pattern of the peripheral nodes 52 depicted in FIG. 5, it is highly probable that a specific pattern readily appearing in the point distribution within the current node 51 will be generated.

Figure 6A:
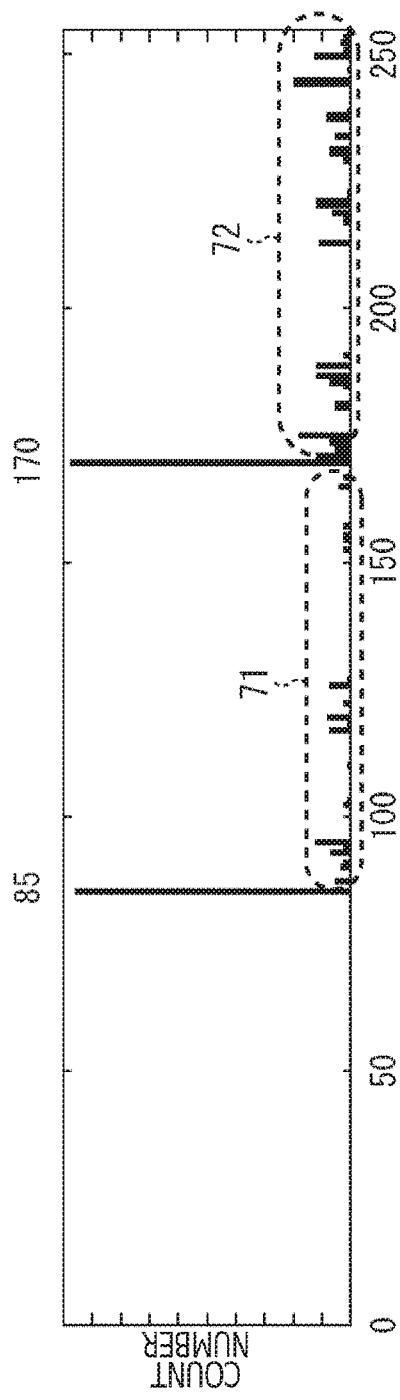
FIGS. 6A and 6B are diagrams illustrating examples of appearance frequencies of childmask patterns.

Depicted in FIG. 6A is an example of a histogram that indicates the frequency with which each point pattern appears within the current node in a case where the pattern is represented by the point distribution of the peripheral nodes. In this histogram, the point pattern is the point distribution of child nodes (i.e., child mask (childmask)). In this instance, each pattern is identified by an identification number. In the example depicted in FIG. 6A, it is obvious that the pattern identified by the identification number "85" and the pattern identified by the identification number "170" appear with higher frequency than the other patterns. A pattern appearing with such high frequency is hereinafter referred to as the maximum likelihood pattern.

In reality, however, as indicated within dashed-line frames 71 and 72 of the histogram depicted in FIG. 6A, the child mask (childmask) of the current node may not be in the above-mentioned maximum likelihood pattern even in a case where the peripheral nodes are in the same point distribution pattern.

As such being the case, when patterns other than the above-mentioned maximum likelihood pattern (the other patterns) are made approximate to (or coincident with) the maximum likelihood pattern, the bias of the child mask (childmask) pattern increases. When, for example, the point patterns enclosed in the dashed-line frames 71 and 72 of the histogram depicted in FIG. 6A are made approximate to (or coincident with) the maximum likelihood pattern, the histogram changes to the one depicted in FIG. 6B so that the bias in the pattern distribution increases. When the bias in the pattern distribution is increased as described above, it is possible to increase the efficiency of lossless encoding.

Figure 6B:
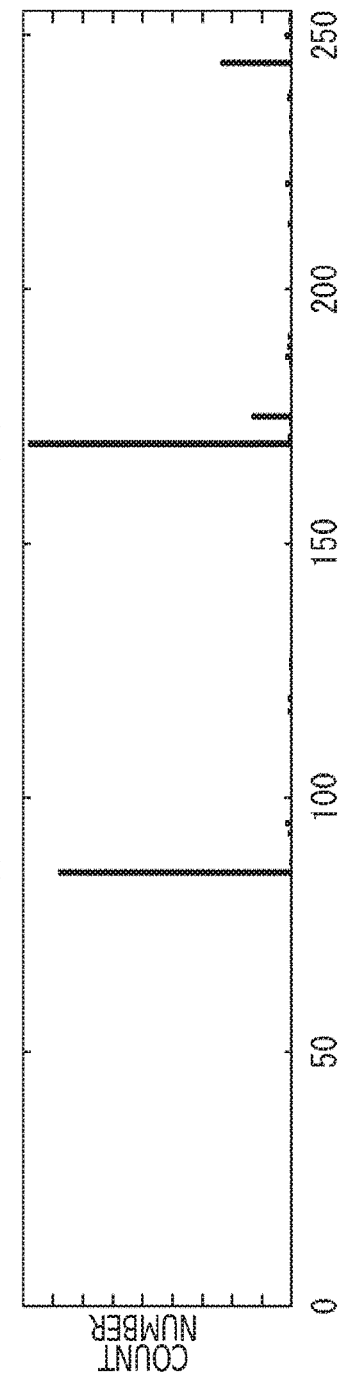
Figure 7:
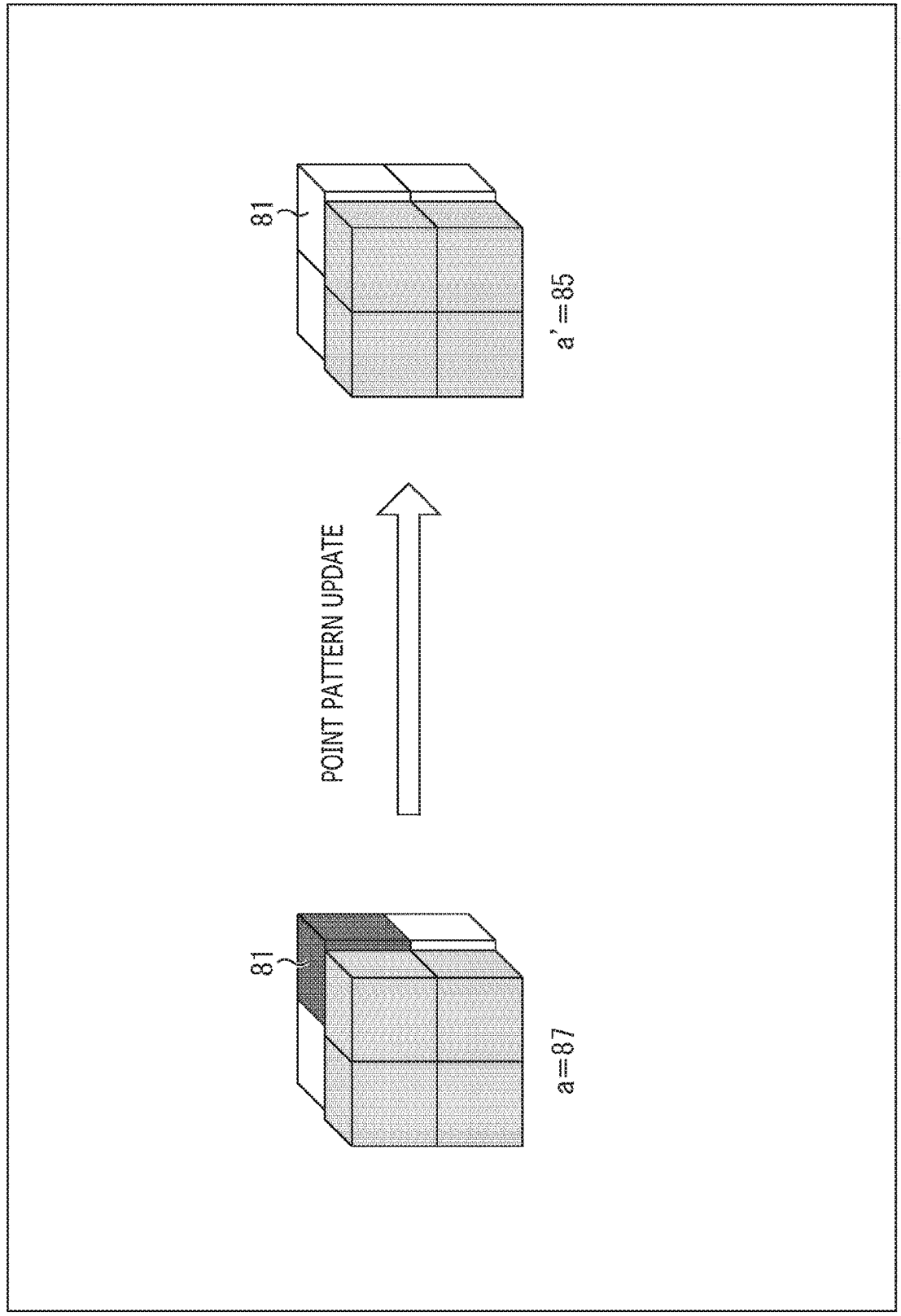
FIG. 7 is a diagram illustrating an example of appearance of a pattern update.

For example, as depicted in FIG. 7, when points in a child node 81 of the child mask (childmask) having a pattern identified by the identification number "87" are deleted, the pattern identified by the identification number "87" is changed to the pattern identified by the identification number "85" (i.e., the maximum likelihood pattern depicted in FIGS. 6A and 6B). When the presence of points in each child node of the current node is manipulated as described above, the child mask (childmask) can be changed to be approximate to (or coincident with) the maximum likelihood pattern.

It should be noted that the degree of pattern approximation (the strength of approximation) may be made controllable. For example, while the strength of approximation is preset as an encoding parameter, the point distribution of child nodes of the current node may be made approximate to the maximum likelihood pattern in accordance with the strength of approximation.

<Maximum Likelihood Pattern>

Figure 8:
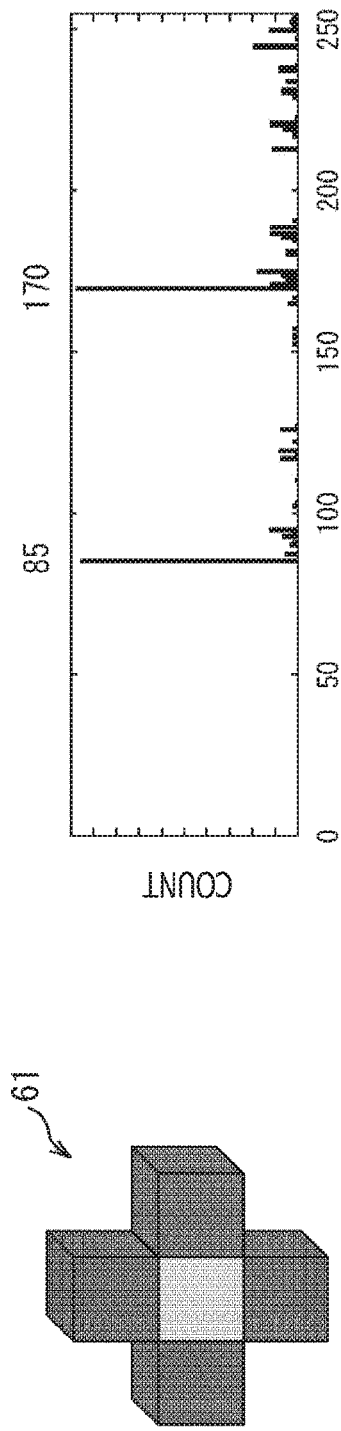
FIGS. 8A, 8B, 8C, and 8D are diagrams illustrating examples of maximum likelihood patterns based on point distribution.
Figure 9:
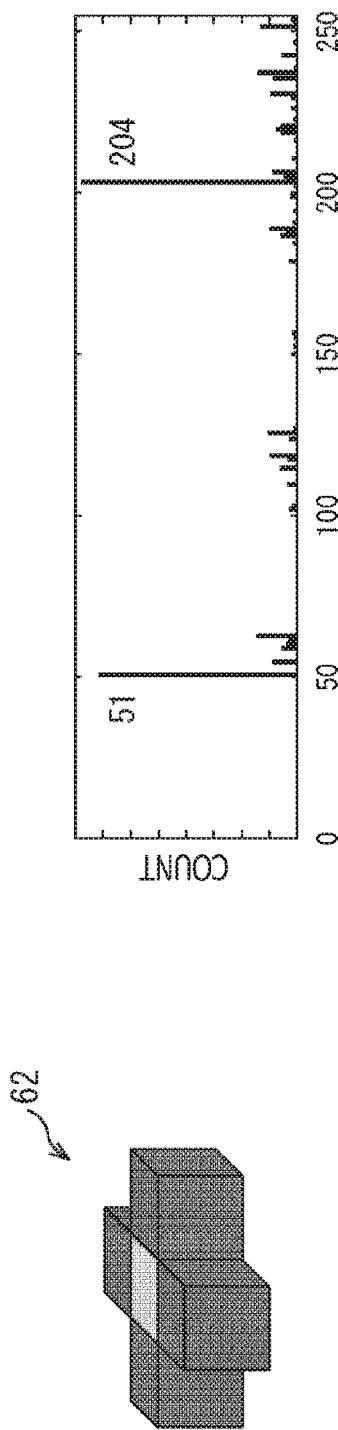
FIGS. 9A, 9B, 9C, and 9D are diagrams illustrating examples of maximum likelihood patterns based on point distribution.

The maximum likelihood pattern is determined for each pattern of point distribution of peripheral nodes. For example, in the case of a pattern 61 depicted in FIG. 5 (FIG. 8A), the pattern identified by the identification number "85" (FIG. 8C) and the pattern identified by the identification number "170" (FIG. 8D) are the maximum likelihood patterns of the child mask (childmask) of the current node as indicated by a histogram depicted in FIG. 8B. Meanwhile, in the case of a pattern 62 depicted in FIG. 5 (FIG. 9A), a pattern identified by the identification number "51" (FIG. 9C) and a pattern identified by the identification number "204" (FIG. 9D) are the maximum likelihood patterns of the child mask (childmask) of the current node as indicated by a histogram depicted in FIG. 9B.

When the child mask (childmask) of the current node is to be changed, the maximum likelihood pattern targeted for such a change may be derived based on the pattern of point distribution of peripheral nodes (e.g., the maximum likelihood pattern may be estimated from structural properties). For example, the histogram (statistical data) of the child mask (childmask) regarding each pattern of point distribution of peripheral nodes may be generated in advance to predetermine the maximum likelihood pattern corresponding to each pattern (make the correspondence relation depicted in FIGS. 8A, 8B, 8C, 8D, 9A, 9B, 9C, and 9D known), and then the maximum likelihood pattern may be derived from the pattern of point distribution of peripheral nodes around the current node in accordance with the known correspondence relation.

Another alternative is to actually perform Octree encoding, derive the histogram (statistical data) of the child mask (childmask) corresponding to the pattern of point distribution of peripheral nodes around the current node from the result of the Octree encoding (from the pattern of the derived child mask (childmask)), and determine the maximum likelihood pattern from the derived statistical data.

It should be noted that the maximum likelihood pattern may be derived, as a maximum likelihood pattern common to all hierarchical layers, from the statistics regarding the child mask (childmask) of each hierarchically layered node or may be derived, as a maximum likelihood pattern of each hierarchical layer, from the statistics regarding each hierarchical layer.

<Distortion Index Value>

The degree of similarity to the maximum likelihood pattern may be evaluated as a distortion with respect to the maximum likelihood pattern. That is, when the child mask (childmask) is changed in such a manner as to decrease the distortion, the child mask (childmask) can be made approximate to (or coincident with) the maximum likelihood pattern.

The index value of the above-mentioned distortion (distortion function) may be any value. For example, it may be a Hamming distance. Further, it may be, for example, a Hausdorff distance. Furthermore, it may be, for example, a score assigned to a specific pattern. For example, an alternative is to assign a predetermined score to each typical distribution pattern such as a planar or linear distribution pattern, add the assigned score in a case where the child mask (childmask) includes such a pattern, and use the added score to evaluate the distortion with respect to the maximum likelihood pattern.

It should be noted that the above distortion index value may be determined by selecting one of a plurality of prepared candidates in accordance with evaluation criteria regarding compressed size or image quality.

<Attribute Information>

To the points in the point cloud, attribute information is given as information other than location information. Therefore, when the point distribution is updated (i.e., the location information is updated), the attribute information may also be updated (changed).

The attribute information may include any appropriate information. For example, the attribute information may include color information regarding the points. Further, the attribute information may include Reflectance of Lidar data. Furthermore, the attribute information may include normal line information (Normal information). Moreover, the attribute information may include a plurality of pieces of information, such as color information and normal line information. Obviously, the attribute information may include information other than the above-mentioned information.

<Method #2>

Method #2 additionally applies differential encoding. Method #1 is a lossy encoding method because it changes the child mask (childmask). Differential encoding is performed to encode unchanged child mask (childmask) information, which is not encoded by method #1. When such differential encoding is performed, it is possible to improve the reproducibility of a point cloud that is to be decoded and reconstructed. For example, it is possible to provide improved image quality (suppress a decrease in image quality) in a case where the reconstructed point cloud is turned into an image.

<Differential Encoding Method>

Any differential encoding method may be used. A method other than an Octree encoding method may be used. For example, a triangular mesh for joining the points with a line may be applied (Mesh encoding). Further, the unchanged child mask (childmask) information may be encoded as is (differential voxel pattern encoding). Furthermore, the unchanged child mask (childmask) information may be predicted based on the voxel pattern (child mask (childmask)) of peripheral nodes, and then a resulting predictive residual may be encoded (predictive encoding based on the voxel pattern of peripheral nodes).

The unchanged child mask (childmask) information is local information regarding a point cloud. A decrease in the encoding efficiency can be suppressed by applying an encoding method that is more suitable for encoding such information (an encoding method providing high encoding efficiency).

Further, differential encoding may be performed so as to encode the whole or part of the unchanged child mask (childmask) information. Lossless encoding can be achieved by encoding the whole of the unchanged child mask (childmask) information.

Furthermore, the encoding method (child mask (childmask) change) designated as method #1 may be regarded as predictive processing for image encoding in order to provide optimal encoding in combination with differential encoding. That is, the amount of child mask (childmask) change may be controlled. In this manner, the allocation of an encoding amount between method #1 encoding and differential encoding can be controlled in order to further increase the encoding efficiency.

For example, a method of calculating an RD or other cost may be used to evaluate the encoding amount so as to optimize the amount of child mask (childmask) change.

When, for example, Cost=D+ΔR, R and D should be assumed to be a combination of encoding by method #1 and differential encoding as indicated in Equations (1) and (2) below in order to determine the allocation of the encoding amount between R and D in such a manner as to minimize the cost.

$$D = D_{octree} + D_{residual} \quad (1)$$

Doctree: Distortion index such as an MSE (Mean Square Error) in an Octree-encoded portion
Dresidual: Distortion index such as an MSE in a Residual-encoded portion $$R = R_{octree} + R_{residual} \quad (2)$$

Roctree: Bit amount in an Octree-encoded portion
Rresidual: Bit amount in a Residual-encoded portion

2. First Embodiment

<Encoding Apparatus>

Figure 10:
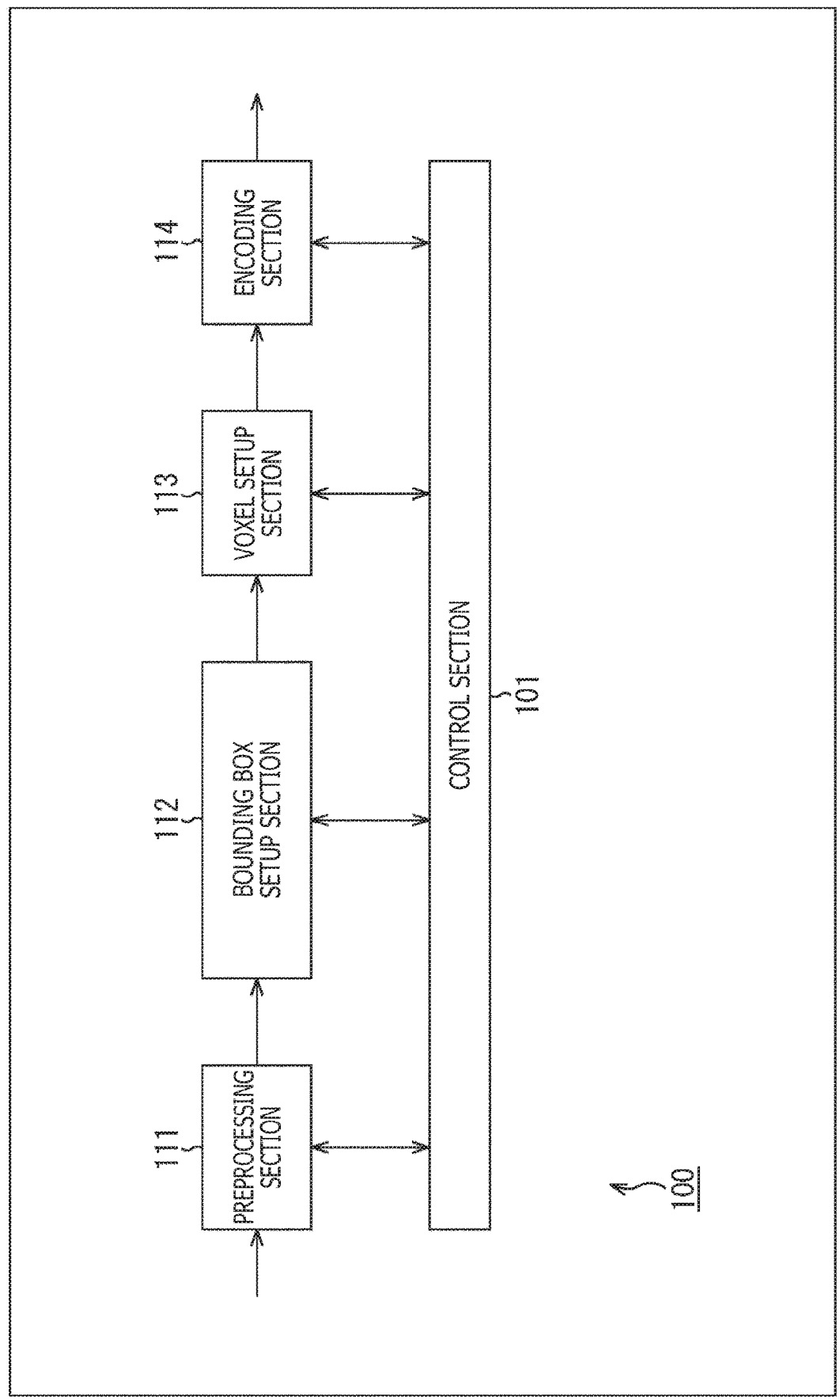
FIG. 10 is a block diagram illustrating a main configuration example of an encoding apparatus.

A detailed configuration and processing flow will now be described. FIG. 10 is a block diagram illustrating a main configuration example of an encoding apparatus that is an embodiment of an information processing apparatus to which the present technology is applied. The encoding apparatus 100 depicted in FIG. 10 encodes point cloud data, which is inputted as an encoding target, by an encoding method designated as method #1 described earlier, and outputs, for example, obtained encoded data.

As depicted in FIG. 10, the encoding apparatus 100 includes a control section 101, a preprocessing section 111, a bounding box setup section 112, a voxel setup section 113, and an encoding section 114.

The control section 101 performs a process related to the control of each processing section in the encoding apparatus 100. For example, the control section 101 exercises control so as to execute or skip (omit) processing that is to be performed by each processing section. Further, the control section 101 controls, for example, processes and processing methods performed by the individual processing sections. The control section 101 exercises such control in accordance, for example, with predetermined control information.

The control section 101 may have any appropriate configuration. For example, the control section 101 may include a CPU (Central Processing Unit), a ROM (Read Only Memory), and a RAM (Random Access Memory), and perform processing by allowing the CPU to load programs and data stored, for example, in the ROM into the RAM and execute them.

Under control of the control section 101, the preprocessing section 111 performs a process related to preprocessing on an encoding target (point cloud data) inputted to the encoding apparatus 100. For example, the preprocessing section 111 performs a predetermined process on data of a point cloud for preprocessing purposes, and supplies the processed data to the bounding box setup section 112.

It should be noted that any appropriate preprocessing may be performed. For example, the preprocessing section 111 may perform a process of reducing noise or changing the resolution (the number of points) for preprocessing purposes. Further, the preprocessing section 111 may alternatively update the arrangement of points in such a manner as to homogenize the density of a point group or give a desired bias to the point group. Another alternative is, for example, to let the encoding apparatus 100 receive an input of data that is, for instance, image information having depth information and not point cloud data, and allow the preprocessing section 111 to perform preprocessing so as to convert the inputted data to point cloud data.

The preprocessing section 111 may have any appropriate configuration. For example, the preprocessing section 111 may include a CPU, a ROM, and a RAM, and perform preprocessing by allowing the CPU to load programs and data stored, for example, in the ROM into the RAM and execute them.

Under control of the control section 101, the bounding box setup section 112 performs a process related to setup of a bounding box for normalizing the location information regarding the encoding target.

Figure 11A:
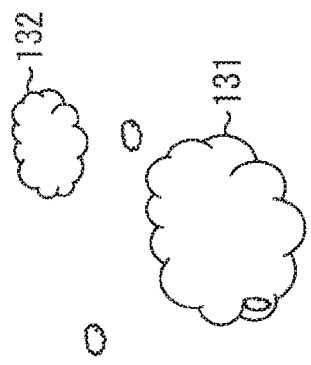
FIGS. 11A, 11B, 11C, and 11D are diagrams illustrating overview examples of encoding.
Figure 11B:
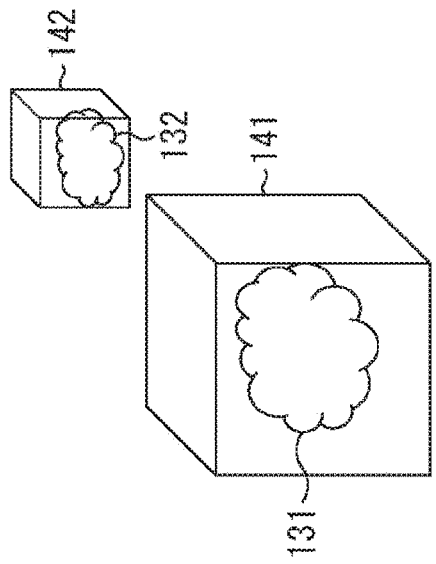

For example, the bounding box setup section 112 sets a bounding box for each object of the encoding target. In a case where an object 131 and an object 132 are expressed by data of a point cloud as depicted in FIG. 11A, the bounding box setup section 112 sets a bounding box 141 and a bounding box 142 that respectively contain the object 131 and the object 132 as depicted in FIG. 11B. Returning to FIG. 10, when the bounding boxes are set, the bounding box setup section 112 supplies information regarding the bounding boxes to the voxel setup section 113.

It should be noted that the bounding box setup section 112 may have any appropriate configuration. For example, the bounding box setup section 112 may include a CPU, a ROM, and a RAM, and perform processing related to bounding box setup by allowing the CPU to load programs and data stored, for example, in the ROM into the RAM and execute them.

Under control of the control section 101, voxel setup section 113 performs a process related to setup of a voxel for quantizing the location information regarding the encoding target.

Figure 11C:
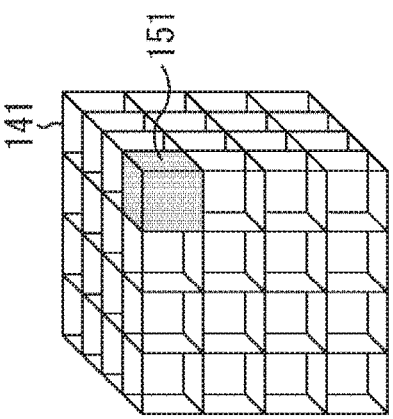

For example, the voxel setup section 113 sets a voxel in a bounding box set by the bounding box setup section 112. For example, the voxel setup section 113 sets a voxel 151 by dividing a bounding box 141 as depicted in FIG. 11C. That is, the voxel setup section 113 quantizes point cloud data in a bounding box by using a voxel (i.e., converts the point cloud data into voxel data). It should be noted that, in a case where a plurality of bounding boxes exists, the voxel setup section 113 converts the point cloud data into voxel data on an individual bounding box basis. That is, in the case of the example in FIG. 11B, the voxel setup section 113 processes the bounding box 142 in a similar manner. When voxel setup is performed as described above, the voxel setup section 113 supplies, for example, the voxel point cloud data (referred to also as the voxel data) (information regarding a data structure for quantizing the location information) and the attribute information to the encoding section 114.

It should be noted that the voxel setup section 113 may have any appropriate configuration. For example, the voxel setup section 113 may include a CPU, a ROM, and a RAM, and perform processing related to voxel setup by allowing the CPU to load programs and data stored, for example, in the ROM into the RAM and execute them.

Under control of the control section 101, the encoding section 114 performs a process related to encoding of the voxel data.

Figure 11D:
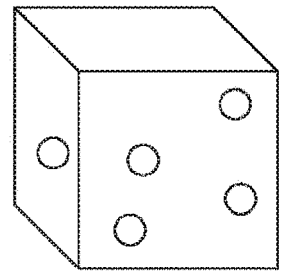

For example, the encoding section 114 decreases the amount of information by converting the voxel data (e.g., the voxel data generated by the voxel setup section 113 as depicted in FIG. 11C) obtained by quantizing the point cloud data into an Octree code (FIG. 11D), generates its sequence of signals, and losslessly encodes the sequence of signals to generate encoded data (bit stream). The encoding section 114 then outputs the encoded data (bit stream) to the outside of the encoding apparatus 100. Data (encoded data and control information) outputted from the encoding apparatus 100 may be decoded, for example, by an undepicted processing section in a subsequent stage in order to restore the point cloud data, may be transmitted from an undepicted communication section and conveyed to a decoding or other apparatus through a predetermined transmission path, or may be recorded on an undepicted recording medium.

It should be noted that the encoding section 114 may have any appropriate configuration. For example, the encoding section 114 may include a CPU, a ROM, and a RAM, and perform processing related to encoding by allowing the CPU to load programs and data stored, for example, in the ROM into the RAM and execute them.

<Encoding Section>

When performing Octree encoding, the encoding section 114 uses method #1 described earlier. FIG. 12 is a block diagram illustrating a main configuration example of the encoding section 114. As depicted in FIG. 12, the encoding section 114 includes a voxel pattern estimation section 211, a voxel pattern update section 212, an Octree encoding section 213, and a lossless encoding section 214.

The voxel pattern estimation section 211 performs a process related to voxel pattern estimation. For example, the voxel pattern estimation section 211 acquires the voxel data generated by the voxel setup section 113. In accordance with the appearance of the point distribution of peripheral nodes around the current node, the voxel pattern estimation section 211 derives the maximum likelihood pattern of the child mask (childmask) from the acquired voxel data, and supplies the derived maximum likelihood pattern to the voxel pattern update section 212.

Any appropriate method may be used for the above-mentioned derivation. As explained with reference to FIG. 3, the maximum likelihood pattern corresponding to the pattern of point distribution of peripheral nodes around the current node may be determined based on a prepared correspondence table (a correspondence table formed based on statistical data corresponding to the pattern of peripheral point distribution). An alternative is to perform Octree encoding in order to obtain relevant statistical data and determine the maximum likelihood pattern corresponding to the pattern of point distribution of peripheral nodes around the current node.

The voxel pattern update section 212 performs a process related to a voxel pattern update. For example, the voxel pattern update section 212 acquires the voxel data generated by the voxel setup section 113 and the maximum likelihood pattern supplied from the voxel pattern estimation section 211. Based on the acquired voxel data and maximum likelihood pattern, the voxel pattern update section 212 updates, as needed, the child mask (childmask) of the current node, which is a processing target, until it is made approximate to (or coincident with) the maximum likelihood pattern corresponding to the pattern of point distribution of peripheral nodes around the current node.

For example, in a case where the pattern of the child mask (childmask) of the current node is different from the maximum likelihood pattern, the voxel pattern update section 212 updates the pattern of that child mask (childmask) until it is made approximate to (or coincident with) the maximum likelihood pattern. Meanwhile, in a case where the pattern of the child mask (childmask) of the current node is coincident with the maximum likelihood pattern, the voxel pattern update section 212 does not update the pattern of that child mask (childmask).

It should be noted that, in the above instance, the strength of approximation, which indicates the degree of pattern approximation, is preset as an encoding parameter. Based on the strength of approximation, the voxel pattern update section 212 may make the point distribution of child nodes of the current node approximate to (or coincident with) the maximum likelihood pattern.

The voxel pattern update section 212 supplies the voxel data, which is updated as needed, to the Octree encoding section 213.

The Octree encoding section 213 performs a process related to Octree encoding. For example, the Octree encoding section 213 acquires the voxel data supplied from the voxel pattern update section 212. Further, the Octree encoding section 213 converts that voxel data into an Octree code to generate a sequence of signals. The Octree encoding section 213 supplies the generated sequence of signals to the lossless encoding section 214.

The lossless encoding section 214 performs a process related to lossless encoding. For example, the lossless encoding section 214 acquires the sequence of signals supplied from the Octree encoding section 213. The lossless encoding section 214 encodes the acquired sequence of signals to generate encoded data (bit stream).

Any appropriate method may be used for the above-mentioned sequence of signals encoding. For example, a VLC (Variable Length Code) method may be applied. Further, the lossless encoding section 214 may encode not only the location information but also the attribute information (e.g., color information, a channel, and normal vector). Moreover, the lossless encoding section 214 may additionally encode, as needed, the control information including relevant information other than the point cloud data, and store the encoded information, for example, in a header or a parameter set.

When the voxel pattern update section 212 updates a child mask (childmask) pattern not coincident with the maximum likelihood pattern until the child mask (childmask) pattern is made approximate to (or coincident with) the maximum likelihood pattern as described above, the encoding apparatus 100 is able to suppress a decrease in the encoding efficiency (typically, increase the encoding efficiency) without changing the resolution (voxel LoD).

<Flow of Encoding Processing>

The flow of encoding processing performed by the encoding apparatus 100 having the above-described configuration will now be described with reference to the flowchart of FIG. 13.

When encoding processing starts, the preprocessing section 111 preprocesses inputted data in step S101.

In step S102, the bounding box setup section 112 sets a bounding box for the preprocessed data.

In step S103, the voxel setup section 113 sets a voxel in the bounding box, which is set in step S102, and generates voxel data.

In step S104, the encoding section 114 converts the voxel data generated in step S103 into an Octree code to generate a sequence of signals, and losslessly encodes the generated sequence of signals to generate a bit stream.

In step S105, the encoding section 114 outputs the bit stream generated in step S104 to the outside of the encoding apparatus 100. The bit stream is, for example, conveyed to a decoding end (e.g., decoding apparatus) or recorded on a recording medium.

Upon completion of step S105, the encoding processing ends. For example, in a case where the encoding target is a video image, the above-described series of processing steps is performed for each frame.

<Flow of Voxel Data Encoding Process>

An example flow of a voxel data encoding process performed in step S104 of FIG. 13 will now be described with reference to the flowchart of FIG. 14. Here, it is assumed that a leaf node is subjected to a child mask (childmask) update, and that the correspondence relation between each pattern of point distribution of peripheral nodes and the maximum likelihood pattern of the child mask (childmask) is predefined.

In the above case, when the voxel data encoding process starts, the voxel pattern estimation section 211 determines in step S121 whether or not the current node targeted for processing is a leaf node. In a case where it is determined that the current node is targeted for a child mask (childmask) update, processing proceeds to step S122.

In step S122, the voxel pattern estimation section 211 derives the maximum likelihood pattern of the child mask (childmask) in accordance with a pattern indicative of the presence of points in the peripheral nodes around the current node.

For example, the voxel pattern estimation section 211 identifies which one of the patterns depicted in FIG. 5 represents the pattern indicative of the presence of points in the peripheral nodes around the current node, and derives the maximum likelihood pattern corresponding to the identified pattern in accordance with prepared information regarding the correspondence relation depicted in FIGS. 8A, 8B, 8C, 8D or FIGS. 9A, 9B, 9C, 9D.

In step S123, the voxel pattern update section 212 makes the pattern of the child mask (childmask) of the current node approximate to (or coincident with) the maximum likelihood pattern. For example, the voxel pattern update section 212 updates the pattern of the child mask (childmask) of the current node so as to decrease the distortion function with respect to the maximum likelihood pattern.

For example, the voxel pattern update section 212 updates the point distribution of child nodes of the current node so as to reduce the Hamming distance between the maximum likelihood pattern and the pattern of point distribution of child nodes of the current node. Further, for example, the voxel pattern update section 212 updates the point distribution of child nodes of the current node so as to reduce the Hausdorff distance between the maximum likelihood pattern and the pattern of point distribution of child nodes of the current node. Furthermore, for example, the voxel pattern update section 212 updates the point distribution of child nodes of the current node in accordance with a score corresponding to the point distribution.

In accordance with the above-described update, the voxel pattern update section 212 may additionally update the attribute information (e.g., color information, reflectance of Lidar data, and normal line information (Normal information)).

Upon completion of step S123, processing proceeds to step S124. Meanwhile, in a case where it is determined in step S121 that the current node is not a leaf node, processing skips steps S122 and S123, and proceeds to step S124.

In step S124, the voxel pattern update section 212 determines whether or not all nodes are processed. In a case where it is determined that any node is left unprocessed, processing returns to step S121 and repeats the subsequent steps with respect to an unprocessed node. That is, steps S121 to S124 are performed as needed with respect to each node.

Subsequently, in a case where it is determined in step S124 that all nodes are processed, processing proceeds to step S125.

In step S125, the Octree encoding section 213 converts a voxel pattern into an Octree code to generate a sequence of signals.

In step S126, the lossless encoding section 214 losslessly encodes the sequence of signals generated in step S124 to generate encoded data (bit stream).

Figure 13:
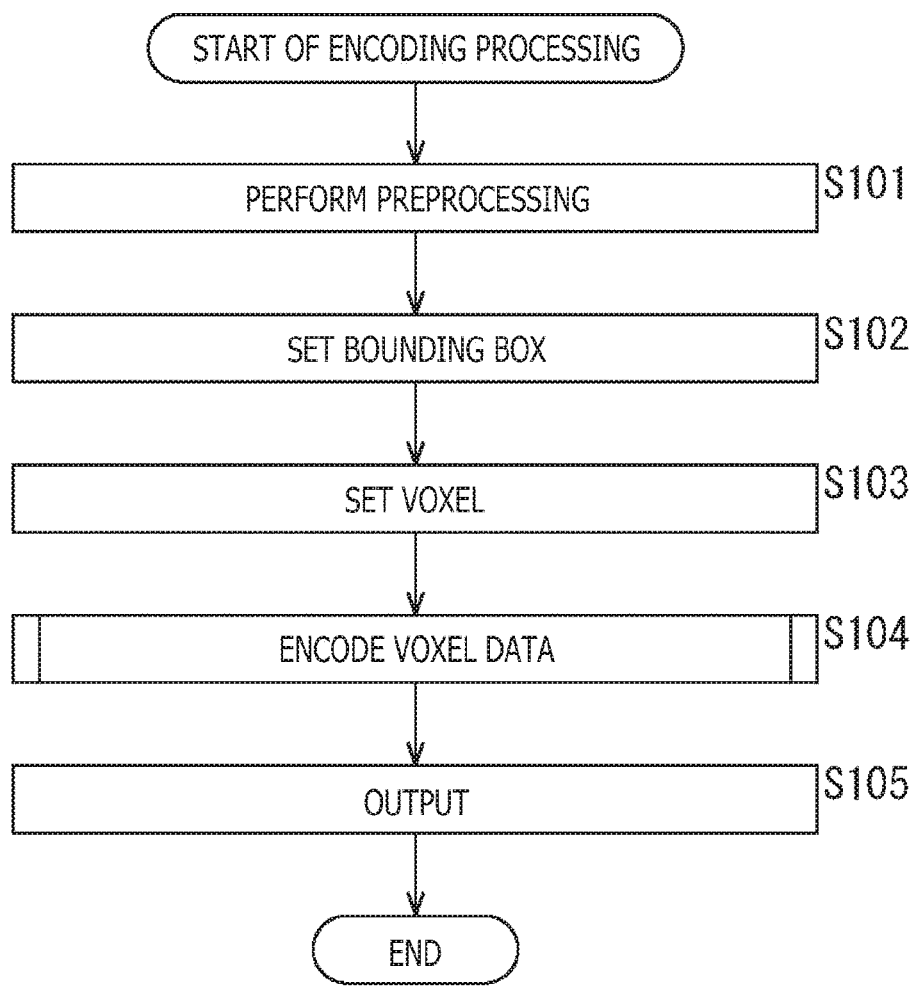
FIG. 13 is a flowchart illustrating an example of a flow of encoding processing.

Upon completion of step S126, the voxel data encoding process ends, and processing returns to FIG. 13.

By performing each process in the above-described manner, the encoding apparatus 100 is able to suppress a decrease in the encoding efficiency (typically, increase the encoding efficiency) without changing the resolution (voxel LoD).

<Flow 2 of Voxel Data Encoding Process>

Figure 15:
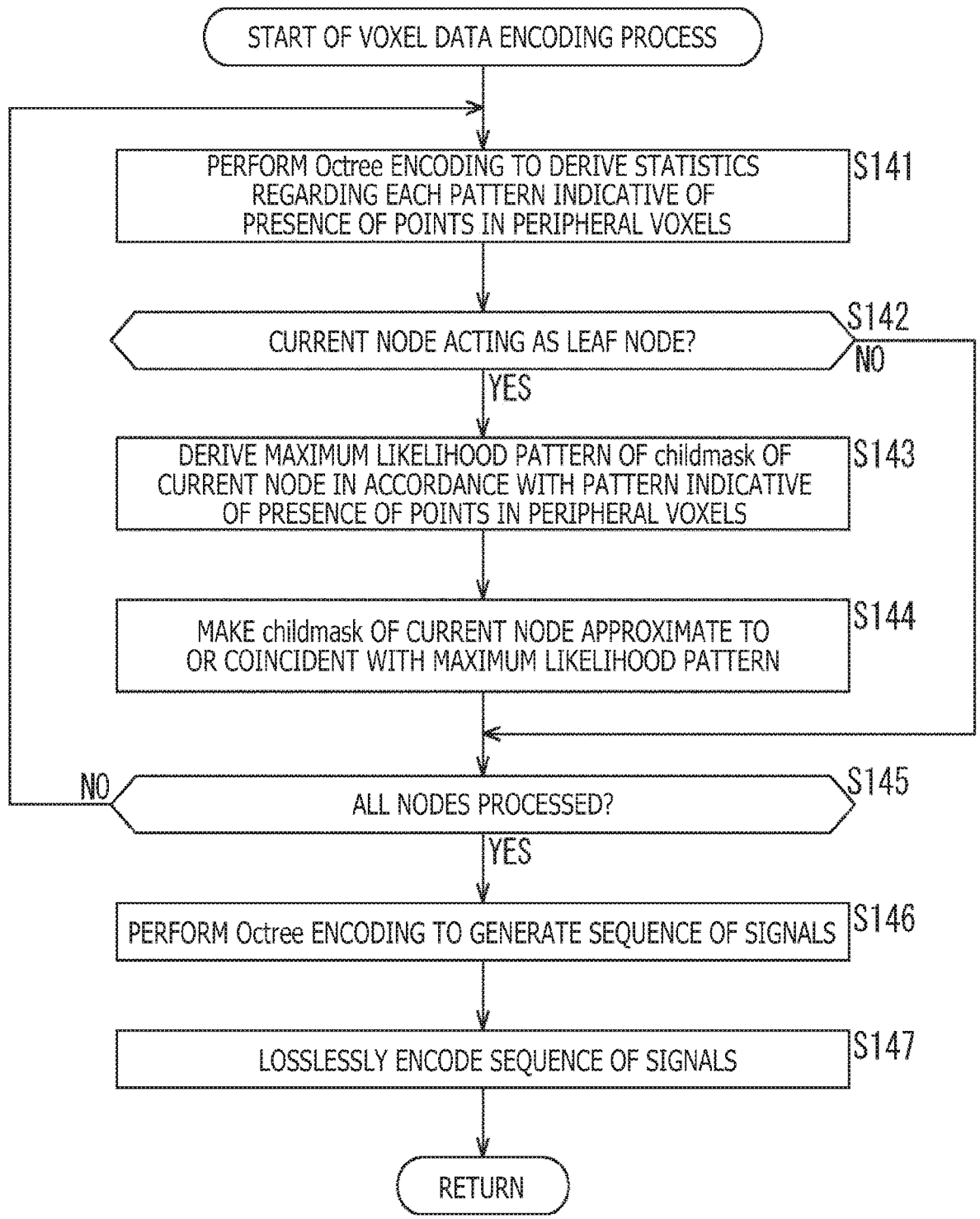
FIG. 15 is a flowchart illustrating an example of the flow of the voxel data encoding process.

It should be noted that the maximum likelihood pattern may be determined from a result obtained when voxel data to be encoded is actually Octree-encoded. The flowchart of FIG. 15 will now be used to describe an example of the voxel data encoding process that is performed in step S104 of FIG. 13 in the above case. Here, it is assumed that the child mask (childmask) of a leaf node is to be updated.

In the above case, when the voxel data encoding process starts, the voxel pattern estimation section 211 derives, in step S141, the statistics regarding each pattern indicative of the presence of points in the peripheral nodes by Octree-encoding the voxel data to be processed. More specifically, the voxel pattern estimation section 211 generates statistical data regarding the point distribution pattern of the child mask (childmask) with respect to each pattern depicted, for example, in FIG. 5, and derives the maximum likelihood pattern of the each pattern (the correspondence relation between the maximum likelihood pattern and a pattern indicative of the presence of points in peripheral voxels).

When the maximum likelihood pattern is determined, processing proceeds to step S142. Steps S142 to S147 are performed in a manner similar to that used in steps S121 to S126 of FIG. 14.

For example, in step S143, the voxel pattern update section 212 derives the maximum likelihood pattern corresponding to a pattern indicative of the presence of points in the peripheral nodes around the current node in accordance with the correspondence relation derived in step S141.

Upon completion of step S147, the voxel data encoding process ends, and processing returns to FIG. 13.

In the above case, too, by performing each process in the above-described manner, the encoding apparatus 100 is able to suppress a decrease in the encoding efficiency (typically, increase the encoding efficiency) without changing the resolution (voxel LoD).

<Flow 3 of Voxel Data Encoding Process>

It should be noted that the node for which the child mask (childmask) is to be updated may be a node other than a leaf node (i.e., an intermediate node). However, when the child mask (childmask) of an intermediate node is to be updated, it is assumed that such an update is limited to the direction of decreasing the number of points (decreasing the number of nodes). The flowchart of FIG. 16 will now be used to describe an example of the voxel data encoding process that is performed in step S104 of FIG. 13 in the above case. Here, it is assumed that the correspondence relation between each pattern of point distribution of peripheral nodes and the maximum likelihood pattern of the child mask (childmask) is predefined.

In the above case, when the voxel data encoding process starts, the voxel pattern estimation section 211 determines, in step S161, whether or not the current node to be processed is a leaf node. In a case where the current node is determined to be a leaf node, processing proceeds to step S162.

Figure 14:
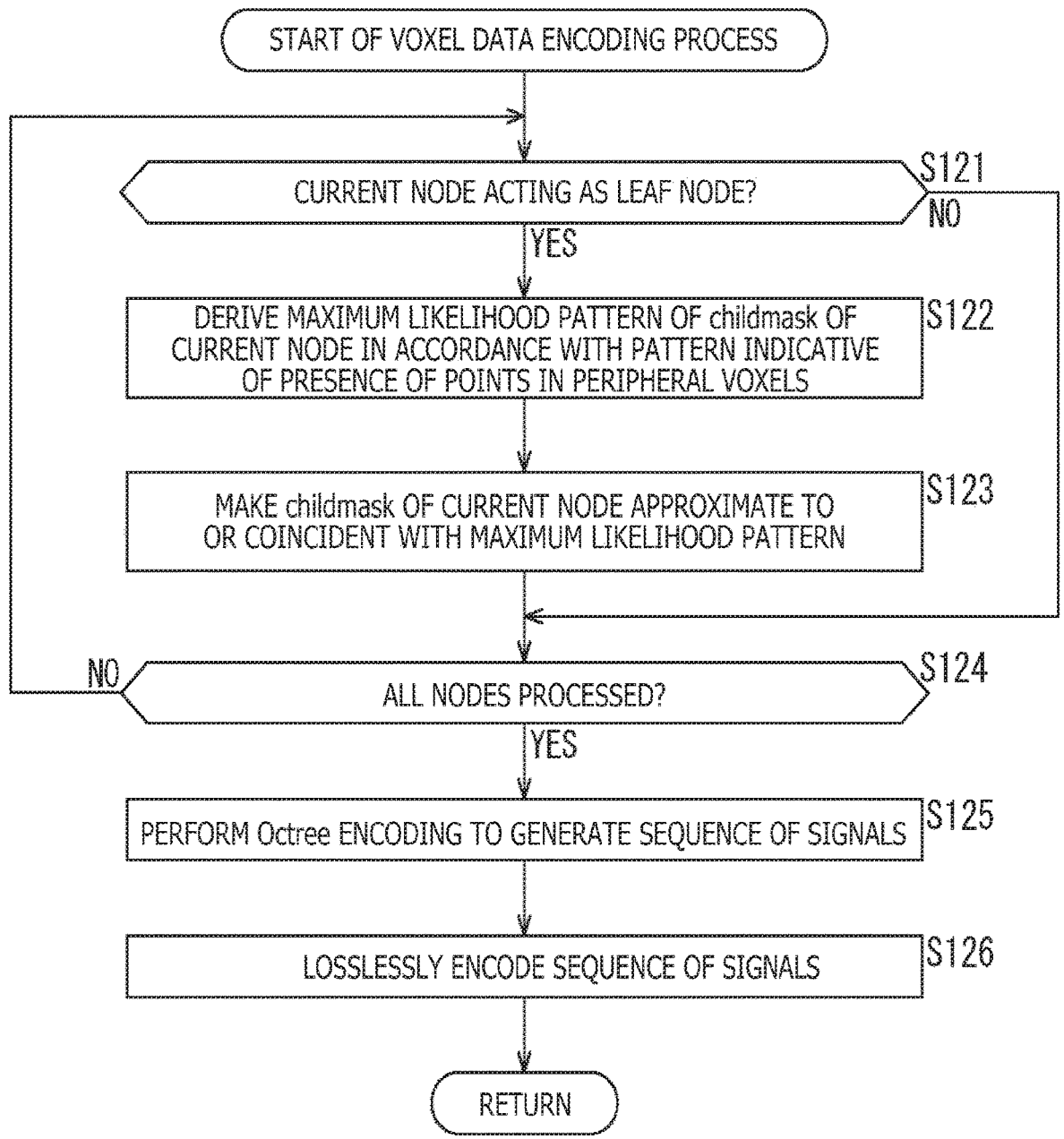
FIG. 14 is a flowchart illustrating an example of a flow of a voxel data encoding process.

Steps S162 and S163 are performed in a manner similar to that used in steps S122 and S123 of FIG. 14. Upon completion of step S163, processing proceeds to step S167.

Meanwhile, in a case where it is determined in step S161 that the current node is not a leaf node, processing proceeds to step S164.

In step S164, the voxel pattern estimation section 211 determines whether or not the current node is an intermediate node in a hierarchical layer targeted for a child mask (childmask) update (a node in a target hierarchical layer). In a case where the current node is determined to be a node in the targeted hierarchical layer, processing proceeds to step S165.

In step S165, the voxel pattern estimation section 211 derives the maximum likelihood pattern of the child mask (childmask) in accordance with a pattern indicative of the presence of points in the peripheral nodes around the current node.

For example, the voxel pattern estimation section 211 identifies which one of the patterns depicted in FIG. 5 represents the pattern indicative of the presence of points in the peripheral nodes around the current node, and derives the maximum likelihood pattern corresponding to the identified pattern in accordance with prepared information regarding the correspondence relation depicted in FIGS. 8A, 8B, 8C, 8D or FIGS. 9A, 9B, 9C, 9D.

However, in the case of processing in step S165, the maximum likelihood pattern derived by the voxel pattern estimation section 211 is limited to a pattern oriented to decrease the number of nodes as viewed from the child mask (childmask) pattern of the present current node (limited to a pattern that can be switched to from the child mask (childmask) pattern of the current node without adding any point).

In step S166, the voxel pattern update section 212 makes the child mask (childmask) pattern of the current node approximate to (or coincident with) the maximum likelihood pattern derived in step S165. For example, the voxel pattern update section 212 updates the child mask (childmask) pattern of the current node so as to decrease the distortion function with respect to the maximum likelihood pattern.

That is, the voxel pattern update section 212 makes the child mask (childmask) pattern of the current node approximate to (or coincident with) the maximum likelihood pattern derived in step S165 only by decreasing the number of points.

In accordance with the above-described update, the voxel pattern update section 212 may additionally update the attribute information (e.g., color information, Reflectance of Lidar data, and normal (Normal) line information).

Upon completion of step S166, processing proceeds to step S167. Meanwhile, in a case where it is determined in step S164 that the current node is not a node in the target hierarchical layer, processing skips steps S165 and S166, and proceeds to step S167.

Steps S167 to S169 are performed in a manner similar to that used in steps S124 to S126 of FIG. 14. Upon completion of step S169, the voxel data encoding process ends, and processing returns to FIG. 13.

In the above case, too, by performing each process in the above-described manner, the encoding apparatus 100 is able to suppress a decrease in the encoding efficiency (typically, increase the encoding efficiency) without changing the resolution (voxel LoD).

<Flow of Index Value Selection Process>

As mentioned earlier, the encoding apparatus 100 may evaluate the degree of similarity to the maximum likelihood pattern as a distortion with respect to the maximum likelihood pattern. The index value of the distortion (the distortion function) may be any value and made selectable.

Figure 17:
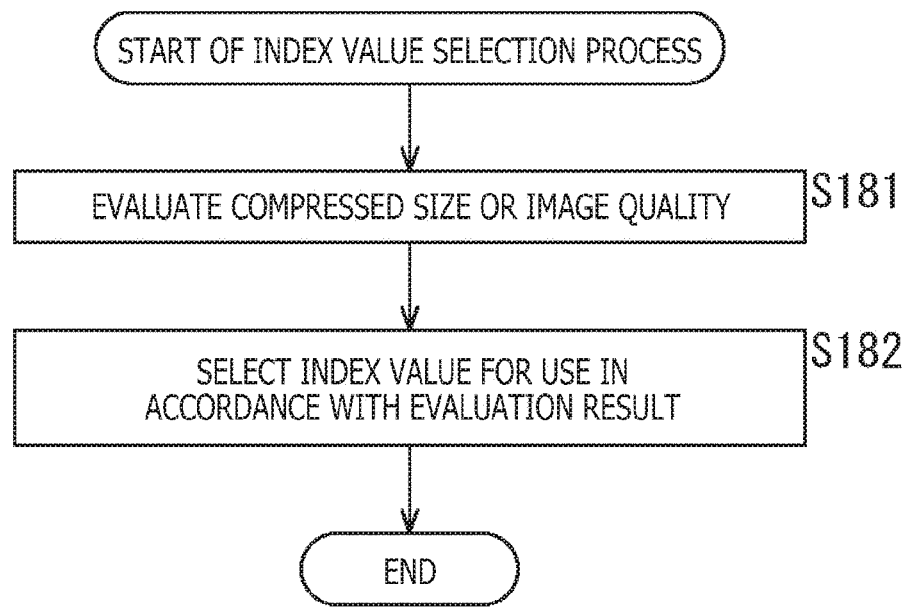
FIG. 17 is a flowchart illustrating an example of an index value selection process.

The flowchart of FIG. 17 will now be used to describe an example of a flow of an index value selection process that is performed when the encoding apparatus 100 makes such a selection. The index value selection process can be performed at any time point before the voxel pattern update section 212 updates the child mask (childmask).

When the index value selection process starts, the voxel pattern update section 212 determines, in step S181, compressed size or image quality regarding point cloud encoding performed by the encoding apparatus 100.

In step S182, the voxel pattern update section 212 selects an index value for use in accordance with the result of the above determination.

When an index value selection is made, the index value selection process ends.

By using the index value selected in the above manner, the voxel pattern update section 212 changes the child mask (childmask) so as to further reduce the distortion. Changing the child mask (childmask) as described above makes it possible to use a more suitable index value for encoding and make the child mask (childmask) more approximate to (or coincident with) the maximum likelihood pattern. Consequently, a decrease in the encoding efficiency can be further suppressed.

<Decoding Apparatus>

Figure 18:
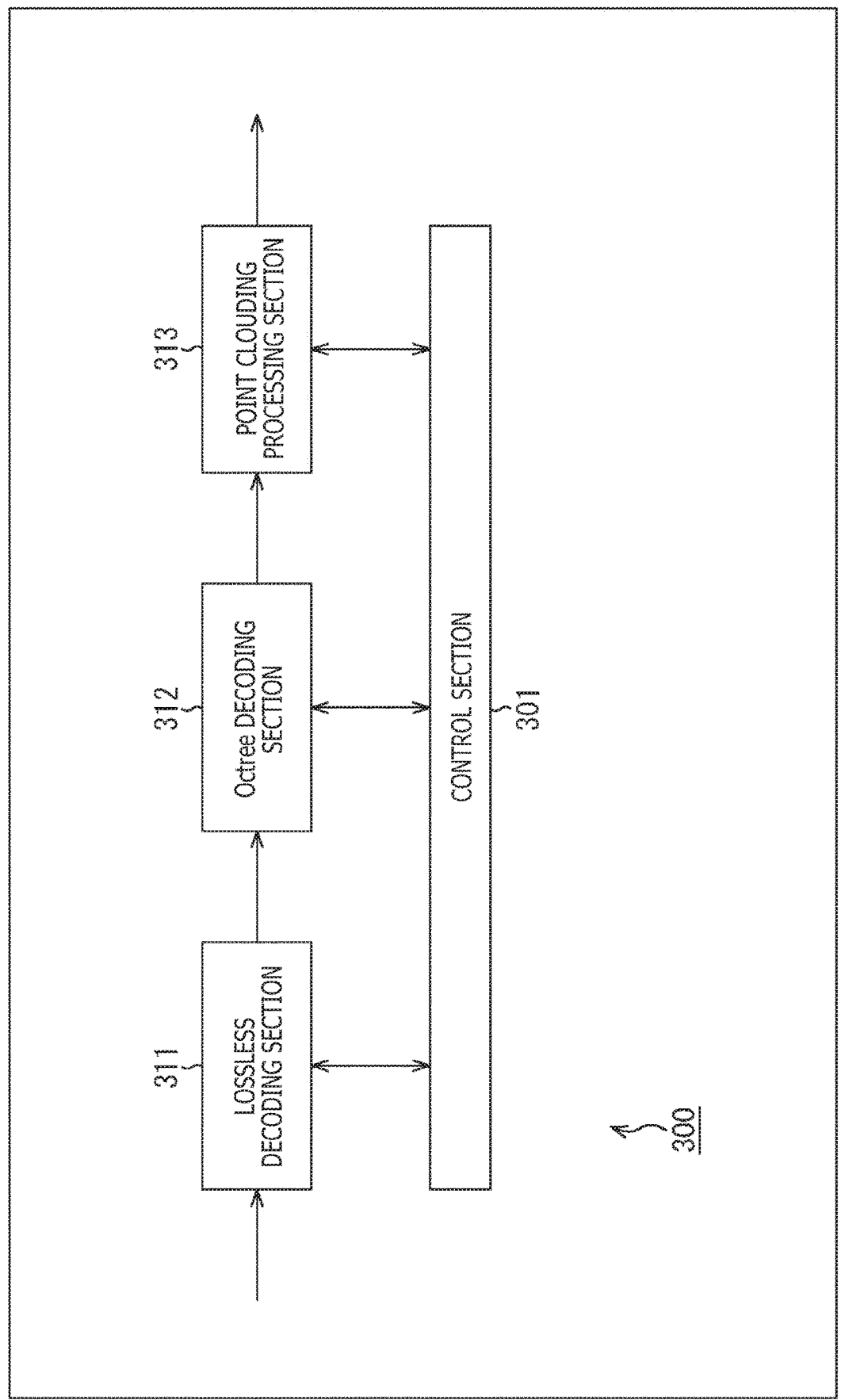
FIG. 18 is a block diagram illustrating a main configuration example of a decoding apparatus.

A decoding apparatus corresponding to the encoding apparatus 100 configured to perform encoding according to method #1 described earlier will now be described. FIG. 18 is a block diagram illustrating a main configuration example of the decoding apparatus, which is an embodiment of the information processing apparatus to which the present technology is applied. The decoding apparatus 300 depicted in FIG. 18 is a decoding apparatus corresponding to the encoding apparatus 100 depicted in FIG. 10. For example, the decoding apparatus 300 decodes encoded data of a point cloud, which is generated by the encoding apparatus 100, in order to restore the data of the point cloud.

As depicted in FIG. 18, the decoding apparatus 300 includes a control section 301, a lossless decoding section 311, an Octree decoding section 312, and a point clouding processing section 313.

The control section 301 performs a process related to the control of each processing section in the decoding apparatus 300. For example, the control section 301 exercises control so as to execute or skip (omit) processing that is to be performed by each processing section. Further, the control section 301 controls, for example, processes and processing methods performed by the individual processing sections. The control section 301 exercises such control in accordance, for example, with predetermined control information.

The control section 301 may have any appropriate configuration. For example, the control section 301 may include a CPU, a ROM, and a RAM, and perform processing by allowing the CPU to load programs and data stored, for example, in the ROM into the RAM and execute them.

Under control of the control section 101, the lossless decoding section 311 performs a process related to lossless decoding. For example, the lossless decoding section 311 acquires a bit stream that is inputted to the decoding apparatus 300. The bit stream is generated, for example, when the encoding apparatus 100 encodes point cloud data by using an encoding method to which the present technology is applied. The lossless decoding section 311 generates a sequence of signals by losslessly decoding the acquired bit stream. The lossless decoding section 311 performs the above lossless decoding by using a decoding method corresponding to a lossless encoding method configured by the lossless encoding section 214 of the encoding apparatus 100. The lossless decoding section 311 supplies the generated sequence of signals to the Octree decoding section 312.

It should be noted that the lossless decoding section 311 may have any appropriate configuration. For example, the lossless decoding section 311 may include a CPU, a ROM, and a RAM, and perform processing related to lossless decoding by allowing the CPU to load programs and data stored, for example, in the ROM into the RAM and execute them.

Under control of the control section 101, the Octree decoding section 312 performs a process related to Octree decoding. For example, the Octree decoding section 312 acquires a sequence of signals that is supplied from the lossless decoding section 311. The Octree decoding section 312 generates voxel data by Octree-decoding the acquired sequence of signals. The Octree decoding section 312 performs the above Octree encoding by using a decoding method corresponding to an Octree encoding method configured by the Octree encoding section 213 of the encoding apparatus 100. The Octree decoding section 312 supplies the generated voxel data to the point clouding processing section 313.

It should be noted that the Octree decoding section 312 may have any appropriate configuration. For example, the Octree decoding section 312 may include a CPU, a ROM, and a RAM, and perform processing related to Octree decoding by allowing the CPU to load programs and data stored, for example, in the ROM into the RAM and execute them.

Under control of the control section 101, the point clouding processing section 313 performs a process related to restoration of point cloud data. For example, the point clouding processing section 313 acquires voxel data that is supplied from the Octree decoding section 312. The point clouding processing section 313 converts the acquired voxel data to point cloud data (generates decoded point cloud data). It should be noted that the point clouding processing section 313 may further convert the generated decoded point cloud data to Mesh data.

The point clouding processing section 313 outputs the generated decoded point cloud data (or Mesh data) to the outside of the decoding apparatus 300. The outputted decoded point cloud data (or Mesh data) may be, for example, image-processed by an undepicted processing section in a subsequent stage, and displayed, for example, on a monitor as image information, or transmitted from an undepicted communication section and conveyed to another apparatus through a predetermined transmission path, or recorded on an undepicted recording medium.

It should be noted that the point clouding processing section 313 may have any appropriate configuration. For example, the point clouding processing section 313 may include a CPU, a ROM, and a RAM, and perform processing related to restoration of point cloud data by allowing the CPU to load programs and data stored, for example, in the ROM into the RAM and execute them.

Adopting the above-described configuration enables the decoding apparatus 300 to correctly decode the bit stream generated by the encoding apparatus 100. That is, the decoding apparatus 300 is able to suppress a decrease in the encoding efficiency (typically, increase the encoding efficiency) without changing the resolution (voxel LoD).

It should be noted that, even in a case where an intermediate node is targeted for a child mask (childmask) update as described above, the maximum likelihood pattern may be determined from a result obtained when voxel data to be encoded is actually Octree-encoded.

Figure 16:
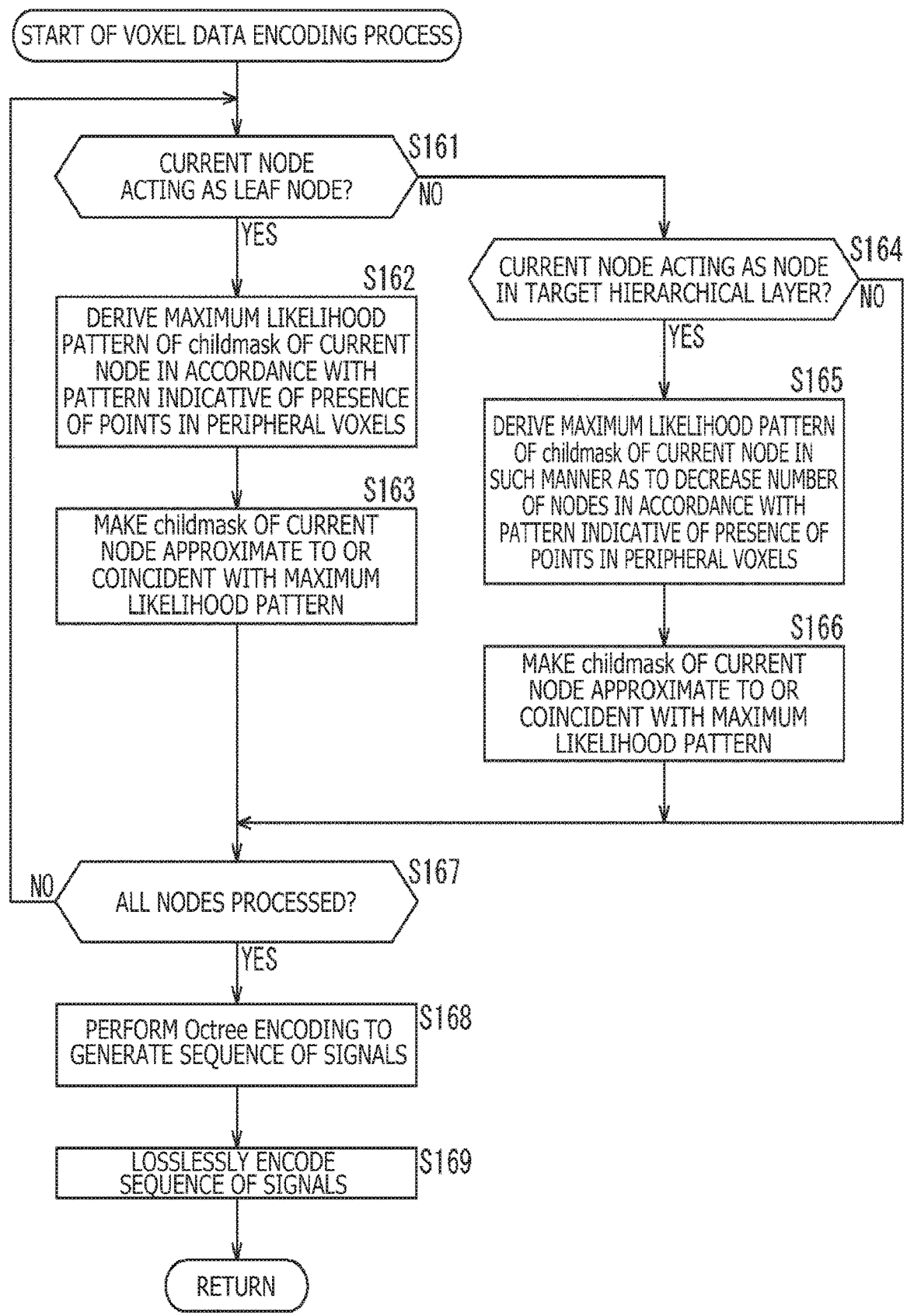
FIG. 16 is a flowchart illustrating an example of the flow of the voxel data encoding process.

In the above case, processing in step S141 (FIG. 15) should be performed before processing in step S161 of the voxel data encoding process (FIG. 16).

<Flow of Decoding Process>

Figure 19:
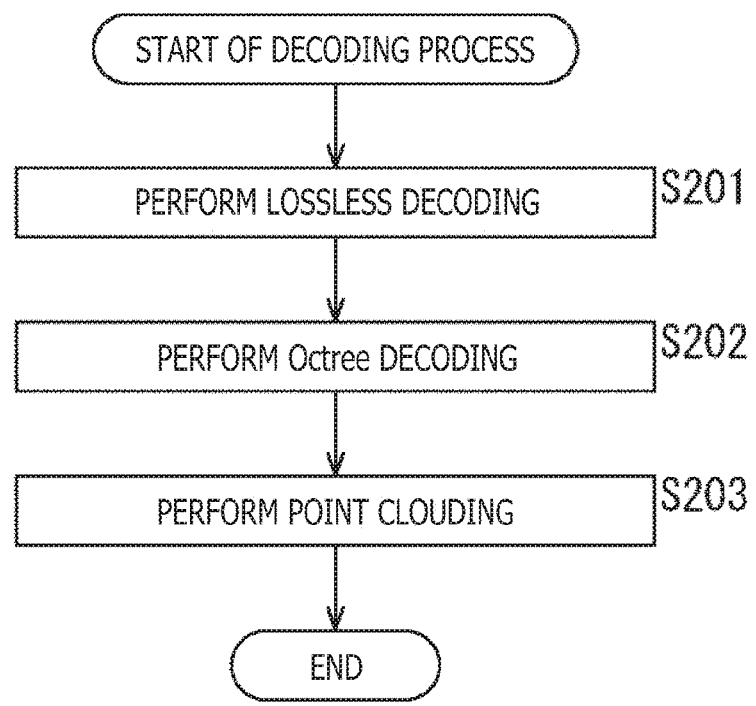
FIG. 19 is a flowchart illustrating an example of a flow of a decoding process.

An example flow of a decoding process performed by the decoding apparatus 300 having the above-described configuration will now be described with reference to the flowchart of FIG. 19.

When the decoding process starts, the lossless decoding section 311 generates a sequence of signals in step S201 by losslessly decoding an inputted bit stream.

In step S202, the Octree decoding section 312 generates voxel data by Octree-decoding the sequence of signals generated in step S201.

In step S203, the point clouding processing section 313 converts the voxel data generated in step S202 into a point cloud.

Upon completion of step S203, the decoding process ends.

By performing the decoding process in the above-described manner, the decoding apparatus 300 is able to correctly decode a bit stream generated by the encoding apparatus 100. That is, the decoding apparatus 300 is able to suppress a decrease in the encoding efficiency (typically, increase the encoding efficiency) without changing the resolution (voxel LoD).

3. Second Embodiment

<Encoding Section>

Differential encoding may be applied in accordance with method #2, which has been described with reference to FIG. 3. In such a case, too, the configuration of the encoding apparatus 100 is basically similar to that described in conjunction with the first embodiment (FIG. 10). However, the encoding method used by the encoding section 114 is different from that described in conjunction with the first embodiment.

Figure 20:
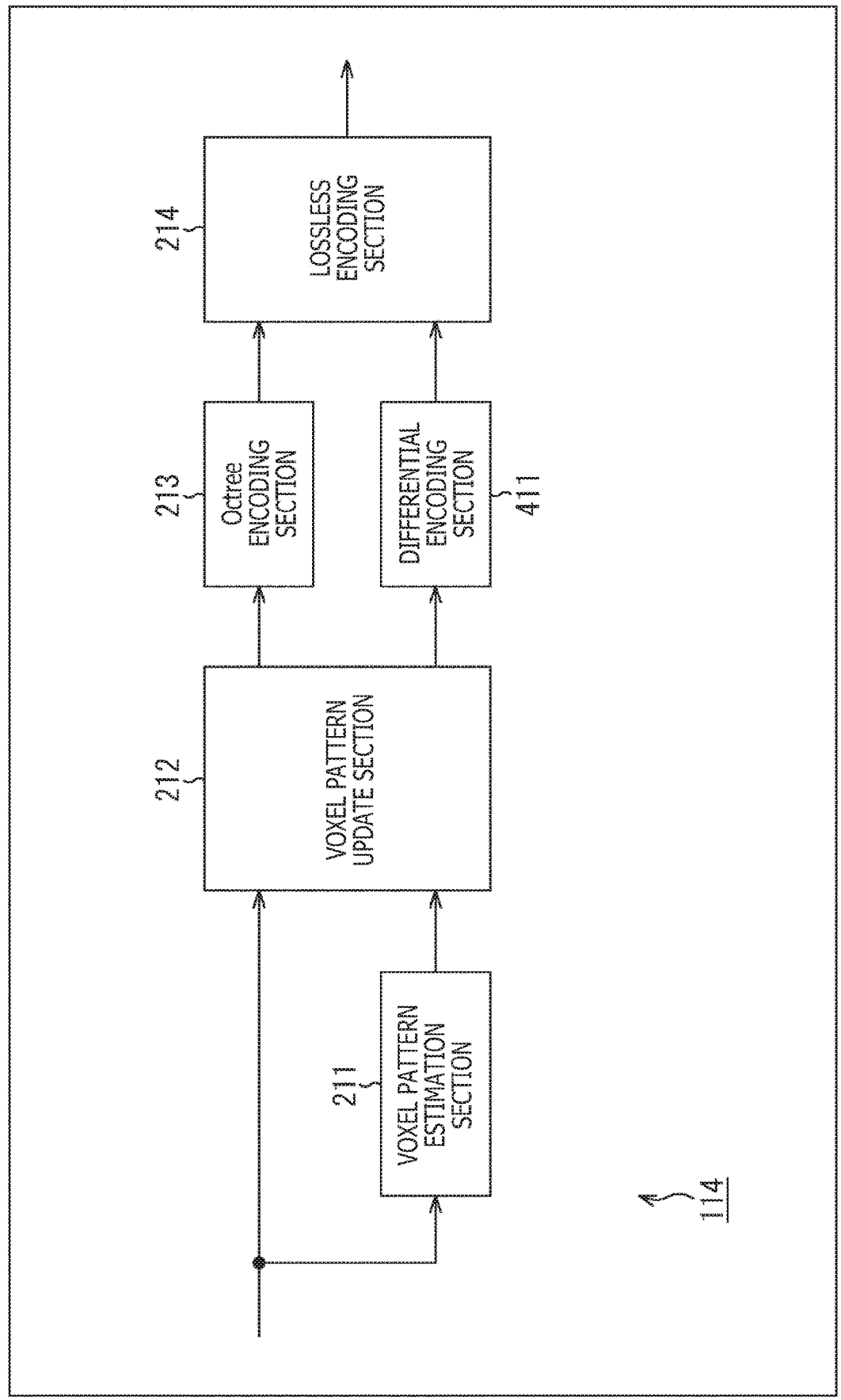
FIG. 20 is a diagram illustrating a main configuration example of the encoding section.

FIG. 20 is a block diagram illustrating a main configuration example of the encoding section 114 in the encoding apparatus 100 that is configured in the present case. More specifically, the encoding section 114 applies method #2, and encodes voxel data by performing encoding according to method #1 and performing differential encoding. As depicted in FIG. 20, the encoding section 114 in the present case includes a differential encoding section 411 in addition to sections ranging from the voxel pattern estimation section 211 to the lossless encoding section 214, which have been described with reference to FIG. 12.

In the present case, the voxel pattern update section 212 supplies, to the Octree encoding section 213, voxel data updated such that the child mask (childmask) pattern not coincident with the maximum likelihood pattern is made approximate to (or coincident with) the maximum likelihood pattern. Further, the voxel pattern update section 212 supplies, to the differential encoding section 411, information regarding an unupdated child mask (childmask) of a node whose child mask (childmask) pattern has been updated.

The differential encoding section 411 performs a process related to differential encoding. For example, the differential encoding section 411 acquires the information regarding an unupdated child mask (childmask) that is supplied from the voxel pattern update section 212. The differential encoding section 411 generates a sequence of signals by encoding the acquired information (differential information) in accordance with a predetermined encoding method. For example, the differential encoding section 411 may convert the information (differential information) to Mesh data. Further, for example, the differential encoding section 411 may convert the information to a sequence of signals as the information regarding some Octree nodes. Furthermore, for example, the differential encoding section 411 may regard the point distribution around the current node as predictive information, and predictively encode that information (differential information) in order to convert it to a sequence of signals. Moreover, the voxel pattern update section 212 may control Octree encoding by the Octree encoding section 213 and differential information encoding by the differential encoding section 411 in such a manner as to optimize an RD cost. The differential encoding section 411 supplies the generated sequence of signals to the lossless encoding section 214.

The lossless encoding section 214 generates encoded data (bit stream) by losslessly encoding the sequence of signals supplied from the Octree encoding section 213 and the sequence of signals supplied from the differential encoding section 411.

Any appropriate method may be used for the above-mentioned sequence of signals encoding. For example, a VLC (Variable Length Code) method may be applied. Further, the lossless encoding section 214 may encode not only the location information but also the attribute information (e.g., color information, a channel, and normal vector). Moreover, the lossless encoding section 214 may additionally encode, as needed, the control information including relevant information other than the point cloud data, and store the encoded information, for example, in a header or a parameter set.

By additionally encoding the information regarding an unupdated child mask (childmask) in the above-described manner, the encoding apparatus 100 is able to improve the reproducibility of a point cloud that is to be decoded and reconstructed. For example, it is possible to provide improved image quality (suppress a decrease in image quality) in a case where the reconstructed point cloud is turned into an image.

<Flow of Voxel Data Encoding Process>

Figure 21:
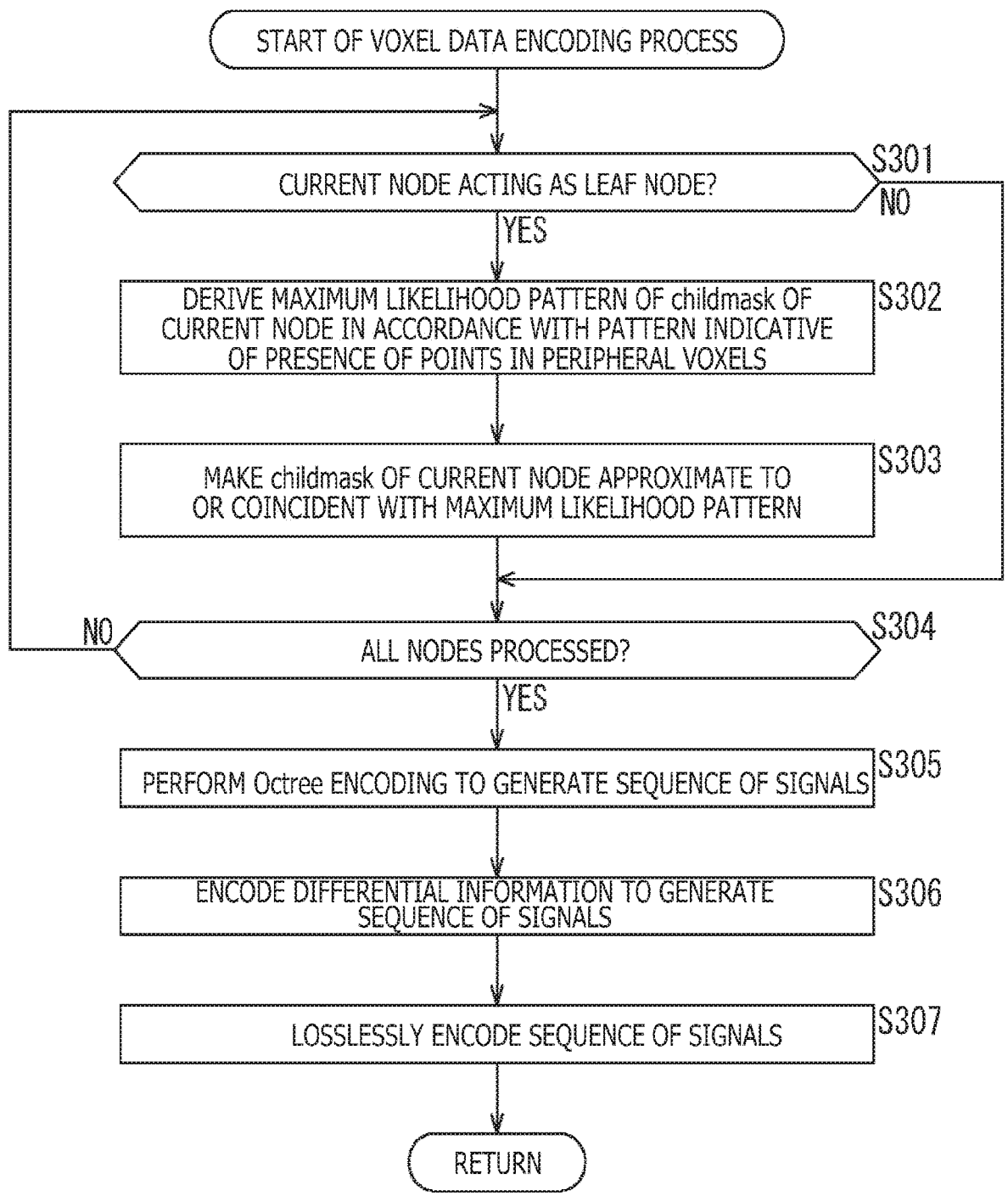
FIG. 21 is a flowchart illustrating an example of the flow of the voxel data encoding process.

The encoding process performed in this case is basically similar to that described in conjunction with the first embodiment (FIG. 13). An example flow of the voxel data encoding process performed in step S104 of FIG. 13 will now be described with reference to the flowchart of FIG. 21. Here, it is assumed that a leaf node is subjected to a child mask (childmask) update, and that the correspondence relation between each pattern of point distribution of peripheral nodes and the maximum likelihood pattern of the child mask (childmask) is predefined.

Steps S301 to S305 are performed in a manner similar to that used in steps S121 to S125 of FIG. 14.

In step S306, the differential encoding section 411 generates a sequence of signals by encoding the information (differential information) regarding an unupdated child mask (childmask).

In step S307, the lossless encoding section 214 generates a bit stream by losslessly encoding the sequence of signals generated in the step S305 and the sequence of signals generated in step S306.

Upon completion of step S307, the voxel data encoding process ends, and processing returns to FIG. 13.

By performing each process in the above-described manner, the encoding apparatus 100 is able to improve the reproducibility of a point cloud that is to be decoded and reconstructed. For example, it is possible to provide improved image quality (suppress a decrease in image quality) in a case where the reconstructed point cloud is turned into an image. That is, the encoding apparatus 100 is able to generate a bit stream that achieves more accurate restoration of a point cloud.

<Decoding Apparatus>

Figure 22:
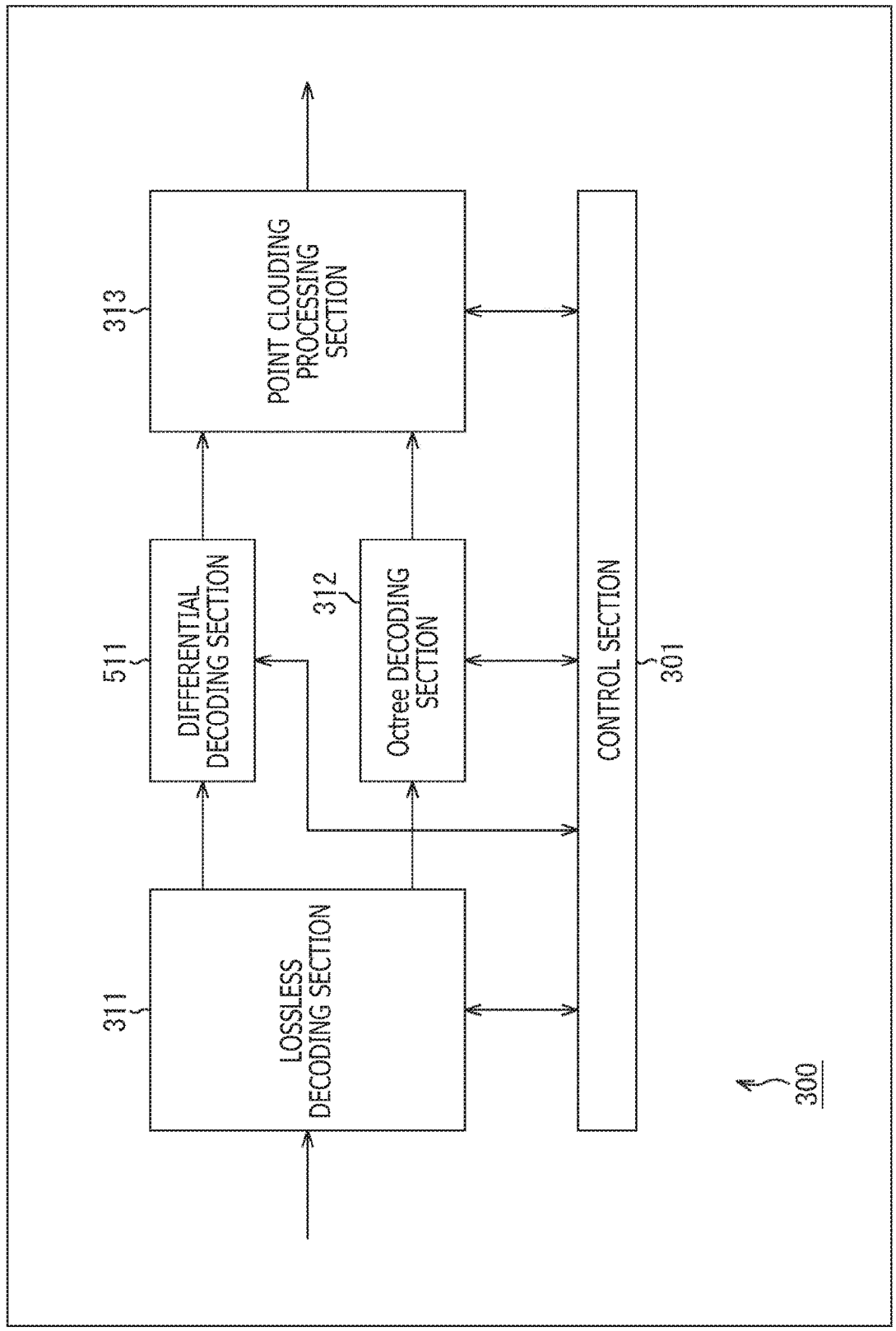
FIG. 22 is a block diagram illustrating a main configuration example of the decoding apparatus.

A decoding apparatus corresponding to the encoding apparatus 100 configured to perform encoding according to method #2 described earlier will now be described. FIG. 22 is a block diagram illustrating a main configuration example of the decoding apparatus, which is an embodiment of the information processing apparatus to which the present technology is applied. The decoding apparatus 300 depicted in FIG. 22 is a decoding apparatus corresponding to the encoding apparatus 100 having the encoding section 114 depicted in FIG. 20. For example, the decoding apparatus 300 decodes encoded data of a point cloud, which is generated by the encoding apparatus 100, in order to restore the data of the point cloud.

As depicted in FIG. 22, the decoding apparatus 300 includes a differential decoding section 511 in addition to sections ranging from the control section 301 to the point clouding processing section 313.

In the above case, the lossless decoding section 311 supplies, to the Octree decoding section 312, a sequence of signals generated from voxel data that is obtained by updating the child mask (childmask) pattern obtained by losslessly decoding a bit stream. Further, the lossless decoding section 311 supplies, to the differential decoding section 511, a sequence of signals generated from information regarding the pattern of an unupdated child mask (childmask) that is obtained by losslessly decoding the bit stream.

Under control of the control section 301, the differential decoding section 511 performs a process related to differential encoding. For example, the differential decoding section 511 acquires a sequence of signals that is generated from information regarding an unupdated child mask (childmask) and supplied from the lossless decoding section 311. The differential decoding section 511 restores voxel data by decoding the acquired sequence of signals according to a decoding method corresponding to a method of encoding performed by the differential encoding section 411 (FIG. 20) of the encoding apparatus 100. The differential decoding section 511 supplies the generated voxel data to the point clouding processing section 313.

It should be noted that the differential decoding section 511 may have any appropriate configuration. For example, the differential decoding section 511 may include a CPU, a ROM, and a RAM, and perform processing related to differential decoding by allowing the CPU to load programs and data stored, for example, in the ROM into the RAM and execute them.

The point clouding processing section 313 converts the voxel data supplied from the Octree decoding section 312 and the voxel data supplied from the differential decoding section 511 to point cloud data (generates decoded point cloud data). It should be noted that the point clouding processing section 313 may further convert the decoded point cloud data to Mesh data.

The point clouding processing section 313 outputs the generated decoded point cloud data (or Mesh data) to the outside of the decoding apparatus 300. The outputted decoded point cloud data (or Mesh data) may be, for example, image-processed by an undepicted processing section in a subsequent stage, and displayed, for example, on a monitor as image information, or transmitted from an undepicted communication section and conveyed to another apparatus through a predetermined transmission path, or recorded on an undepicted recording medium.

By additionally decoding the information regarding an unupdated child mask (childmask) in the above-described manner, the decoding apparatus 300 is able to restore a point cloud more accurately. This makes it possible to provide improved image quality (suppress a decrease in image quality), for example, in a case where the reconstructed point cloud is turned into an image.

<Flow of Decoding Process>

Figure 23:
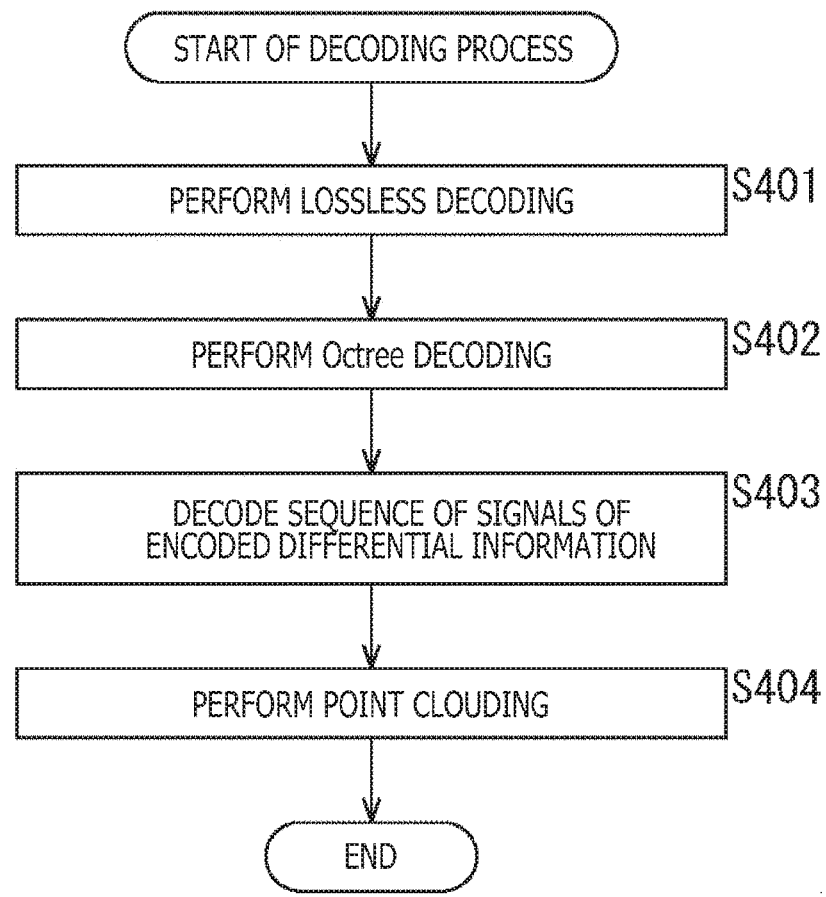
FIG. 23 is a flowchart illustrating an example of the flow of the decoding process.

An example flow of the decoding process performed in the above case will now be described with reference to the flowchart of FIG. 23.

When the decoding process starts, the lossless decoding section 311 generates, in step S401, a sequence of signals by losslessly decoding an inputted bit stream.

In step S402, the Octree decoding section 312 generates voxel data by Octree-decoding the sequence of signals generated in step S401 (the sequence of signals generated from voxel data obtained by updating the child mask (childmask) pattern).

In step S403, the differential decoding section 511 generates voxel data by decoding the sequence of signals generated in step S401 (the sequence of signals generated from information regarding the pattern of an unupdated child mask (childmask)).

In step S404, the point clouding processing section 313 converts the voxel data generated in step S402 and the voxel data generated in step S403 into a point cloud.

Upon completion of step S404, the decoding process ends.

By performing the above-described decoding process, the decoding apparatus 300 is able to restore a point cloud more accurately. This makes it possible to provide improved image quality (suppress a decrease in image quality), for example, in a case where the reconstructed point cloud is turned into an image.

It should be noted that, even in a case where method #2 is applied as described above, various changes may be made as far as they are consistent with the foregoing description, as is the case with method #1. For example, the node targeted for a child mask (childmask) change (target node) may be an intermediate node. Further, any appropriate index value of distortion may be used. Any appropriate method may be used to derive the maximum likelihood pattern. In accordance with a change in the point distribution (i.e., a change in the location information), the relevant attribute information may also be changed.

4. Supplementary Notes

<Control Information>

The control information associated with the present technology, which has been described in conjunction with the foregoing embodiments, may be conveyed from an encoding end to a decoding end. For example, the control information (e.g., enabled flag) for controlling whether or not to enable (or disable) the application of the present technology described above may be conveyed. Further, for example, the control information for specifying the range (e.g., the upper or lower limit of block size, both the upper and lower limits of block size, slice, picture, sequence, component, view, or layer) where the application of the present technology described above is to be enabled (or disabled).

<Computer>

The above-described series of processes may be performed by hardware or by software. In a case where the series of processes is to be performed by software, programs included in the software are installed on a computer. Here, the computer may be a computer incorporated in dedicated hardware or a general-purpose personal computer or other computer capable of performing various functions when various programs are installed on the computer.

FIG. 24 is a block diagram illustrating an example hardware configuration of a computer that executes programs to perform the above-described series of processes.

In a computer 900 depicted in FIG. 24, a CPU (Central Processing Unit) 901, a ROM (Read Only Memory) 902, and a RAM (Random Access Memory) 903 are interconnected by a bus 904.

The bus 904 is further connected to an input/output interface 910. The input/output interface 910 is connected to an input section 911, an output section 912, a storage section 913, a communication section 914, and a drive 915.

The input section 911 includes, for example, a keyboard, a mouse, a microphone, a touch panel, and an input terminal. The output section 912 includes, for example, a display, a speaker, and an output terminal. The storage section 913 includes, for example, a hard disk, a RAM disk, and a nonvolatile memory. The communication section 914 includes, for example, a network interface. The drive 915 drives a removable medium 921 such as a magnetic disk, an optical disk, a magneto-optical disk, or a semiconductor memory.

In the computer configured as described above, the CPU 901 performs the above-described series of processes, for example, by loading the programs stored in the storage section 913 into the RAM 903 through the input/output interface 910 and the bus 904, and executing the loaded programs. The RAM 903 also stores, as needed, for example, data necessary for enabling the CPU 901 to perform various processes.

The programs to be executed by the computer (CPU 901) may be applied when they are recorded on the removable medium 921 supplied, for example, as a package medium. In such a case, the programs can be installed in the storage section 913 through the input/output interface 910 when the removable medium 921 is inserted into the drive 915.

Further, the programs may be supplied through a wired or wireless transmission medium such as a local area network, the Internet, or a digital satellite broadcasting system. In such a case, the programs can be received by the communication section 914 and installed in the storage section 913.

Moreover, the programs may be preinstalled in the ROM 902 or the storage section 913.

<Application Targets of the Present Technology>

The foregoing description deals with a case where the present technology is applied to Octree encoding of point cloud data. However, the present technology is applicable not only to Octree encoding of point cloud data but also to Octree encoding of 3D data compliant with an established standard. That is, the contents and processing orders of various processes concerning encoding and decoding and the specifications for 3D data, metadata, and various other data are not limited as far as they are consistent with the present technology described above. For example, the above-described processes and data may be partly omitted as far as such omissions are consistent with the present technology.

Further, the encoding apparatus 100 and the decoding apparatus 300 have been described above as example applications of the present technology. However, the present technology is applicable to any configuration for handling 3D data.

For example, the present technology may be applied to various electronic equipment such as transmitters and receivers (e.g., television receivers and mobile phones) used for satellite broadcasting, cable TV and other cable broadcasting, distribution on the Internet, and distribution by cellular communication to terminals or applied to apparatuses (e.g., hard disk recorders and cameras) for recording, for example, 3D data on a storage medium such as an optical disk, a magnetic disk, and a flash memory or reproducing, for example, 3D data from such a storage medium.

Further, for example, the present technology may be implemented as a partial configuration of an apparatus such as a processor (e.g., video processor) functioning as a system LSI (Large Scale Integration), a module (e.g., video module) using, for example, a plurality of processors, a unit (e.g., video unit) using, for example, a plurality of modules, or a set (e.g., video set) obtained by providing a unit with an additional function.

Furthermore, for example, the present technology may be applied to a network system including a plurality of apparatuses. For example, the present technology may be implemented to provide crowd computing in which processing is shared by a plurality of apparatuses through a network in order to perform processing in a collaborative manner. For example, the present technology may be implemented in crowd servicing for providing services related to 3D data to terminals such as computers, AV (Audio Visual) equipment, mobile information processing terminals, and IoT (Internet of Things) devices.

It should be noted that the term "system," which is used in the specification, refers to an aggregate of a plurality of component elements (e.g., apparatuses and modules (parts)), and is applicable no matter whether or not all the component elements are within the same housing. Therefore, the term "system" may refer not only to a plurality of apparatuses accommodated in separate housings and connected through a network, but also to a single apparatus including a plurality of modules accommodated in a single housing.

<Fields and Uses to which Present Technology Is Applicable>

For example, systems, apparatuses, and processing sections to which the present technology is applied may be used in various fields such as transportation, medical treatment, crime prevention, agriculture, stock raising, mining, beauty care, factory production, household appliances, meteorology, and nature monitoring. Further, such systems, apparatuses, and processing sections may be applied to various uses.

<Other>

The term "flag," which is used in the specification, is information that identifies a plurality of different states, and includes not only information used to identify two different states, namely, true (1) and false (0) states, but also information capable of identifying three or more different states. Therefore, the "flag" may take, for example, two values such as "1" and "0" or take three or more values. That is, the "flag" may include any number of bits, for example, one bit or a plurality of bits. Further, it is conceivable that identification information (including a flag) may be included in a bit stream. It is also conceivable that differential information regarding the identification information with respect to certain standard information may be included in a bit stream. Consequently, when used in the specification, the "flag" and the "identification information" include not only such information itself but also the differential information with respect to standard information.

Furthermore, various information (e.g., metadata) regarding encoded data (bit stream) may be transmitted or recorded in any form as far as it is associated with encoded data. Here, the term "associating" is used, for example, in a situation where specific data is to be processed, and means to make other data usable (linkable) at the time of processing of the specific data. That is, data associated with each other may be compiled into a single data set or respectively handled as individual data. For example, information associated with encoded data (image) may be conveyed through a transmission path other than the one for the encoded data (image). Moreover, for example, the information associated with encoded data (image) may be recorded on a recording medium other than the one for the encoded data (image) (or recorded in a different recording area of the same recording medium). It should be noted that the term "associating" may be used with respect to a part of a data set instead of the whole data set. For example, an image and information corresponding to the image may be associated with each other in relation to a plurality of frames, one frame, a part of a frame, or any other appropriate portion.

It should be noted that, when used in the specification, the terms, for example, "combine," "multiplex," "add," "integrate," "include," "store," "put in," "plug in," and "insert" mean to compile a plurality of things into one piece, for instance, compile encoded data and metadata into a single data set. These terms indicate a method of "associating" in a manner described above.

Further, the embodiments of the present technology are not limited to the above-described embodiments, and may be variously modified without departing from the spirit of the present technology.

For example, elements described as a configuration of one apparatus (or one processing section) may be configured to form a plurality of apparatuses (or a plurality of processing sections). Conversely, elements described above as the configurations of a plurality of apparatuses (or a plurality of processing sections) may be configured to form a configuration of one apparatus (or one processing section). Further, elements not described above may be added to the configuration of each apparatus (or each processing section). Furthermore, as far as the configuration and operation of the whole system substantially remain unchanged, some elements configured to form a certain apparatus (or a certain processing section) may be included in the configuration of another apparatus (or another processing section).

Moreover, for example, the above-mentioned programs may be executed in any apparatus. In such a case, an apparatus executing the programs should have necessary functions (e.g., necessary functional blocks) and be able to acquire necessary information.

Additionally, for example, each step in a flowchart may be performed by one apparatus or performed by a plurality of apparatuses in a shared manner. In addition, in a case where a plurality of processes is included in a single step, the plurality of processes may be performed by one apparatus or performed by a plurality of apparatuses in a shared manner. That is, a plurality of processes included in a single step may be performed as processes in a plurality of steps. Conversely, processes described in conjunction with a plurality of steps may be performed entirely in a single step.

Further, for example, a program to be executed by the computer may be such that the processes in individual steps describing the program may be performed in a chronological order described in the specification or performed in a parallel manner or at a required time point in response, for example, to a program call. That is, the processes in the individual steps may be performed in an order different from the above-described order as far as no inconsistency occurs. Furthermore, the processes in the individual steps describing the program may be performed in parallel or in combination with processes performed by another program.

Moreover, a plurality of technologies related to the present technology may be implemented independently on an individual basis as far as no inconsistency occurs. It is obvious that any plurality of portions of the present technology may be implemented together. For example, the whole or part of the present technology described in conjunction with any of the foregoing embodiments may be implemented in combination with the whole or part of the present technology described in conjunction with another embodiment. Further, any part or the whole of the present technology described above may be implemented together with another technology not described above.

It should be noted that the present technology may configure the following configurations as well.

(1)
An information processing apparatus including:
a point distribution update section that updates, for Octree encoding of point cloud data, a point distribution of child nodes of a current node in accordance with a peripheral point distribution around the current node; and an Octree encoding section that generates a sequence of signals by performing Octree encoding with the point distribution updated by the point distribution update section.

(2)
The information processing apparatus according to (1), in which
the point distribution update section updates the point distribution of the child nodes of the current node so as to decrease a distortion function with respect to a maximum likelihood pattern of the point distribution of the child nodes corresponding to the peripheral point distribution.

(3)
The information processing apparatus according to (2), in which
the point distribution update section updates the point distribution of the child nodes of the current node so as to make the point distribution of the child nodes of the current node coincident with the maximum likelihood pattern.

(4)
The information processing apparatus according to (2) or (3), in which
the point distribution update section updates the point distribution of the child nodes of the current node so as to make the point distribution of the child nodes of the current node approximate to the maximum likelihood pattern.

(5)
The information processing apparatus according to (4), in which
the point distribution update section makes the point distribution of the child nodes of the current node approximate to the maximum likelihood pattern in accordance with a preset strength of approximation.

(6)
The information processing apparatus according to any one of (2) to (5), in which
the point distribution update section updates the point distribution of the child nodes of the current node so as to reduce the Hamming distance between the maximum likelihood pattern and the pattern of the point distribution of the child nodes of the current node.

(7)
The information processing apparatus according to any one of (2) to (6), in which
the point distribution update section updates the point distribution of the child nodes of the current node so as to reduce the Hausdorff distance between the maximum likelihood pattern and the pattern of the point distribution of the child nodes of the current node.

(8)
The information processing apparatus according to any one of (2) to (7), in which
the point distribution update section updates the point distribution of the child nodes of the current node in accordance with a score corresponding to the point distribution.

(9)
The information processing apparatus according to any one of (2) to (8), in which
the point distribution update section updates the point distribution of the child nodes of the current node in accordance with an index value selected based on evaluation criteria regarding compressed size or image quality.

(10)
The information processing apparatus according to any one of (2) to (9), in which
the point distribution update section derives the maximum likelihood pattern in accordance with statistical data corresponding to the pattern of the peripheral point distribution.

(11)
The information processing apparatus according to any one of (2) to (10), in which
the point distribution update section derives the maximum likelihood pattern in accordance with statistical data derived by Octree-encoding the point cloud data.

(12)
The information processing apparatus according to any one of (2) to (11), in which
the point distribution update section independently derives the maximum likelihood pattern of each hierarchical layer subjected to the Octree encoding.

(13)
The information processing apparatus according to any one of (2) to (12), in which
the point distribution update section updates attribute information in correspondence with the updated point distribution of the child nodes of the current node.

(14)
The information processing apparatus according to (13), in which
the attribute information includes color information.

(15)
The information processing apparatus according to (13) or (14), in which
the attribute information includes Reflectance of Lidar data.

(16)
The information processing apparatus according to any one of (13) to (15), in which
the attribute information includes normal line information.

(17)

The information processing apparatus according to any one of (1) to (16), further including:

a differential information encoding section that generates a sequence of signals by encoding differential information including the point distribution of the child nodes of the current node that is not updated by the point distribution update section.

(18)

The information processing apparatus according to (17), in which the differential information encoding section generates the sequence of signals by converting the differential information to a Mesh.

(19)

The information processing apparatus according to (17) or (18), in which the differential information encoding section generates the sequence of signals from the differential information.

(20)

The information processing apparatus according to any one of (17) to (19), in which the differential information encoding section generates the sequence of signals by regarding the peripheral point distribution around the current node as predictive information and predictively encoding the differential information.

(21)

The information processing apparatus according to any one of (17) to (20), further including:

a control section that controls the Octree encoding and the encoding of the differential information so as to optimize an RD cost.

(22)

The information processing apparatus according to any one of (1) to (21), further including:

a lossless encoding section losslessly encoding the sequence of signals.

(23)

The information processing apparatus according to any one of (1) to (22), further including:

a voxel setup section setting a voxel for quantizing the point distribution of the point cloud data, in which the point distribution update section updates the point distribution of the child nodes of the current node when data of the voxel set by the voxel setup section is to be Octree-encoded.

(24)

An information processing method including the steps of:
updating, for Octree encoding of point cloud data, a point distribution of child nodes of a current node in accordance with a peripheral point distribution around the current node; and generating a sequence of signals by performing Octree encoding with the updated point distribution.

REFERENCE SIGNS LIST

100 Encoding apparatus, 101 Control section, 111 Pre-processing section, 112 Bounding box setup section, 113 Voxel setup section, 114 Encoding section, 211 Voxel pattern estimation section, 212 Voxel pattern update section, 213 Octree encoding section, 214 Lossless encoding section, 300 Decoding apparatus, 301 Control section, 311 Lossless decoding section, 312 Octree decoding section, 313 Point clouding processing section, 411 Differential encoding section, 511 Differential decoding section

The invention claimed is:

1. An information processing apparatus, comprising:
a point distribution update section that updates, for Octree encoding of point cloud data, a point distribution of child nodes of a current node in accordance with a peripheral point distribution around the current node; and
an Octree encoding section that generates a sequence of signals by performing Octree encoding with the point distribution updated by the point distribution update section.

2. The information processing apparatus according to claim 1, wherein
the point distribution update section updates the point distribution of the child nodes of the current node so as to decrease a distortion function with respect to a maximum likelihood pattern of the point distribution of the child nodes corresponding to the peripheral point distribution.

3. The information processing apparatus according to claim 2, wherein
the point distribution update section updates the point distribution of the child nodes of the current node so as to make the point distribution of the child nodes of the current node coincident with the maximum likelihood pattern.

4. The information processing apparatus according to claim 2, wherein
the point distribution update section updates the point distribution of the child nodes of the current node so as to make the point distribution of the child nodes of the current node approximate to the maximum likelihood pattern.

5. The information processing apparatus according to claim 4, wherein
the point distribution update section makes the point distribution of the child nodes of the current node approximate to the maximum likelihood pattern in accordance with a preset strength of approximation.

6. The information processing apparatus according to claim 2, wherein
the point distribution update section updates the point distribution of the child nodes of the current node so as to reduce a Hamming distance between the maximum likelihood pattern and the pattern of the point distribution of the child nodes of the current node.

7. The information processing apparatus according to claim 2, wherein
the point distribution update section updates the point distribution of the child nodes of the current node so as to reduce a Hausdorff distance between the maximum likelihood pattern and the pattern of the point distribution of the child nodes of the current node.

8. The information processing apparatus according to claim 2, wherein
the point distribution update section updates the point distribution of the child nodes of the current node in accordance with a score corresponding to the point distribution.

9. The information processing apparatus according to claim 2, wherein
the point distribution update section updates the point distribution of the child nodes of the current node in accordance with an index value selected based on evaluation criteria regarding compressed size or image quality.

10. The information processing apparatus according to claim 2, wherein
the point distribution update section derives the maximum likelihood pattern in accordance with statistical data corresponding to the pattern of the peripheral point distribution.

11. The information processing apparatus according to claim 2, wherein
the point distribution update section derives the maximum likelihood pattern in accordance with statistical data derived by Octree-encoding the point cloud data.

12. The information processing apparatus according to claim 2, wherein
the point distribution update section independently derives the maximum likelihood pattern of each hierarchical layer subjected to the Octree encoding.

13. The information processing apparatus according to claim 2, wherein
the point distribution update section updates attribute information in correspondence with the updated point distribution of the child nodes of the current node.

14. The information processing apparatus according to claim 13, wherein
the attribute information includes color information.

15. The information processing apparatus according to claim 1, further comprising:
a differential information encoding section that generates a sequence of signals by encoding differential information including the point distribution of the child nodes of the current node that is not updated by the point distribution update section.

16. The information processing apparatus according to claim 15, wherein
the differential information encoding section generates the sequence of signals by converting the differential information to a Mesh.

17. The information processing apparatus according to claim 15, wherein
the differential information encoding section generates the sequence of signals from the differential information.

18. The information processing apparatus according to claim 15, wherein
the differential information encoding section generates the sequence of signals by regarding the peripheral point distribution around the current node as predictive information and predictively encoding the differential information.

19. The information processing apparatus according to claim 15, further comprising:
a control section that controls the Octree encoding and the encoding of the differential information so as to optimize an RD cost.

20. An information processing method, comprising:
updating, for Octree encoding of point cloud data, a point distribution of child nodes of a current node in accordance with a peripheral point distribution around the current node; and
generating a sequence of signals by performing Octree encoding with the updated point distribution.

* * * * *